(12) United States Patent
Tanaka et al.

(10) Patent No.: US 10,875,192 B2
(45) Date of Patent: Dec. 29, 2020

(54) TRANSFER EQUIPMENT AND DETERMINATION METHOD

(71) Applicant: Kabushiki Kaisha Toshiba, Minato-ku (JP)

(72) Inventors: Junya Tanaka, Tokyo (JP); Akihito Ogawa, Fujisawa (JP); Takafumi Sonoura, Yokohama (JP); Haruna Eto, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 293 days.

(21) Appl. No.: 15/899,789

(22) Filed: Feb. 20, 2018

(65) Prior Publication Data

US 2019/0030730 A1 Jan. 31, 2019

(30) Foreign Application Priority Data

Jul. 25, 2017 (JP) .................. 2017-143390

(51) Int. Cl.
*B25J 15/06* (2006.01)
*B25J 9/16* (2006.01)
*B25J 9/00* (2006.01)
*B25J 13/08* (2006.01)
*B25J 15/00* (2006.01)

(52) U.S. Cl.
CPC ......... *B25J 15/0625* (2013.01); *B25J 9/0093* (2013.01); *B25J 9/1669* (2013.01); *B25J 9/1697* (2013.01); *B25J 13/087* (2013.01); *B25J 15/0052* (2013.01); *Y10S 901/40* (2013.01); *Y10S 901/47* (2013.01)

(58) Field of Classification Search
None
See application file for complete search history.

(56) References Cited

U.S. PATENT DOCUMENTS

| | | | |
|---|---|---|---|
| 9,205,558 B1 * | 12/2015 | Zevenbergen | B25J 9/1664 |
| 10,415,577 B2 * | 9/2019 | Tsubokawa | F04D 17/12 |
| 2005/0065662 A1 * | 3/2005 | Reindle | A47L 9/2821 |
| | | | 701/1 |
| 2006/0070713 A1 * | 4/2006 | Wanke | D21F 7/04 |
| | | | 162/198 |

(Continued)

FOREIGN PATENT DOCUMENTS

| | | |
|---|---|---|
| JP | 3983907 | 9/2007 |
| JP | 2013-154457 | 8/2013 |

(Continued)

*Primary Examiner* — Tung S Lau
(74) *Attorney, Agent, or Firm* — Oblon, McClelland, Maier & Neustadt, L.L.P.

(57) ABSTRACT

According to one embodiment, transfer equipment includes: a first negative-pressure generation source; a plurality of first vacuum suction parts; a sensor part; and a first determination circuit. The sensor part configured to acquire a plurality of measured values corresponding to the negative pressure of each of the first vacuum suction parts. The first determination circuit configured to set a first threshold value based on the measured values and determine a vacuum suction state of the first vacuum suction parts corresponding to the measured valued based on the first threshold value and the measured values.

8 Claims, 16 Drawing Sheets

(56) References Cited

U.S. PATENT DOCUMENTS

| | | | |
|---|---|---|---|
| 2007/0283893 A1* | 12/2007 | Schuster | A01J 5/007 119/14.02 |
| 2009/0121592 A1* | 5/2009 | De Nando | A61B 50/10 312/209 |
| 2011/0180161 A1* | 7/2011 | Boren | E03F 1/007 137/487.5 |
| 2011/0192547 A1* | 8/2011 | Yip | H01L 21/67132 156/758 |
| 2013/0019901 A1* | 1/2013 | Gerhards | A47L 9/2842 134/21 |
| 2016/0137435 A1 | 5/2016 | Tanaka et al. | |
| 2016/0207195 A1 | 7/2016 | Eto et al. | |

FOREIGN PATENT DOCUMENTS

| | | |
|---|---|---|
| JP | 2014-135390 | 7/2014 |
| JP | 2015-40130 | 3/2015 |
| JP | 2016-94280 | 5/2016 |
| JP | 2016-132521 | 7/2016 |

* cited by examiner

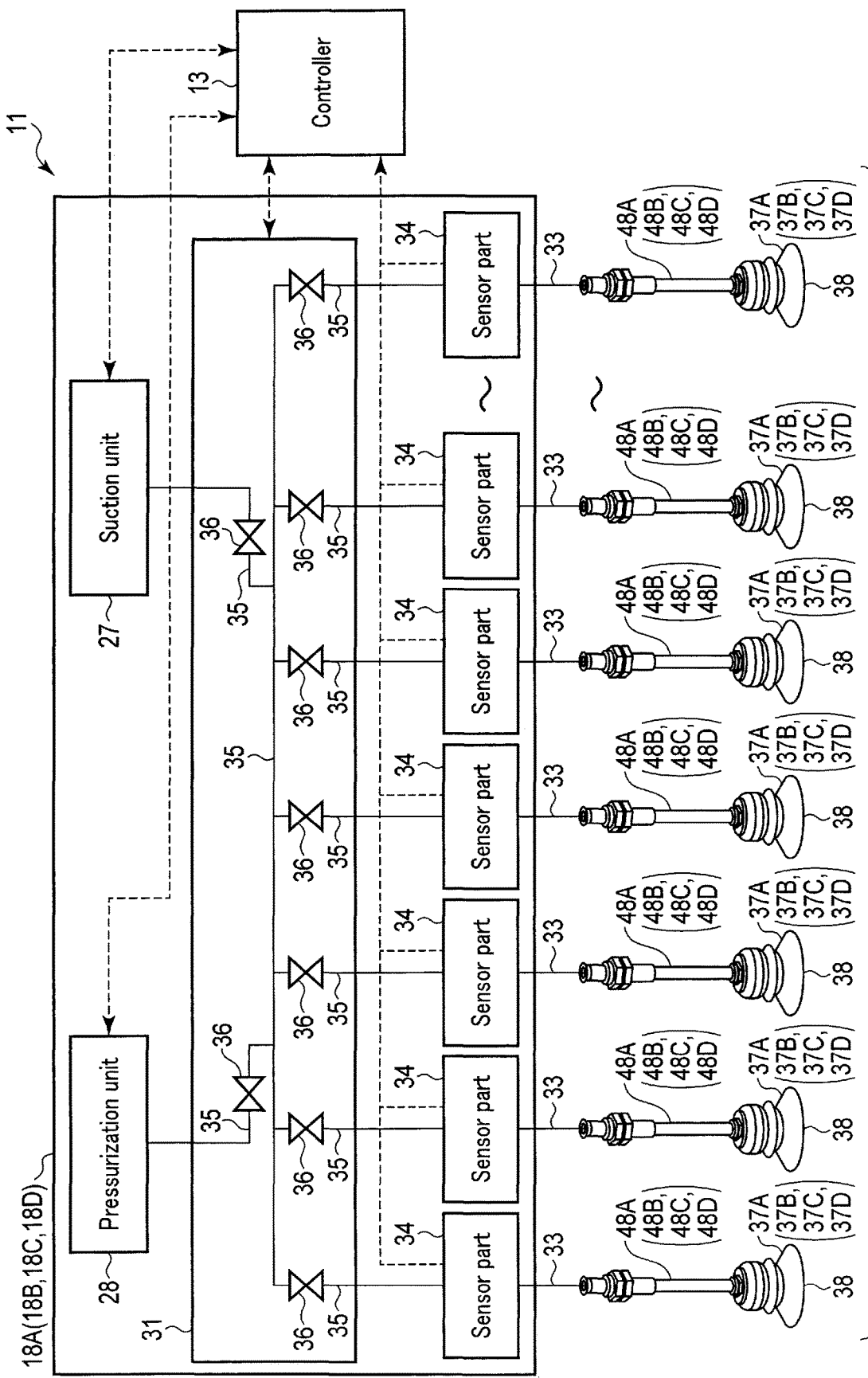
F I G. 2

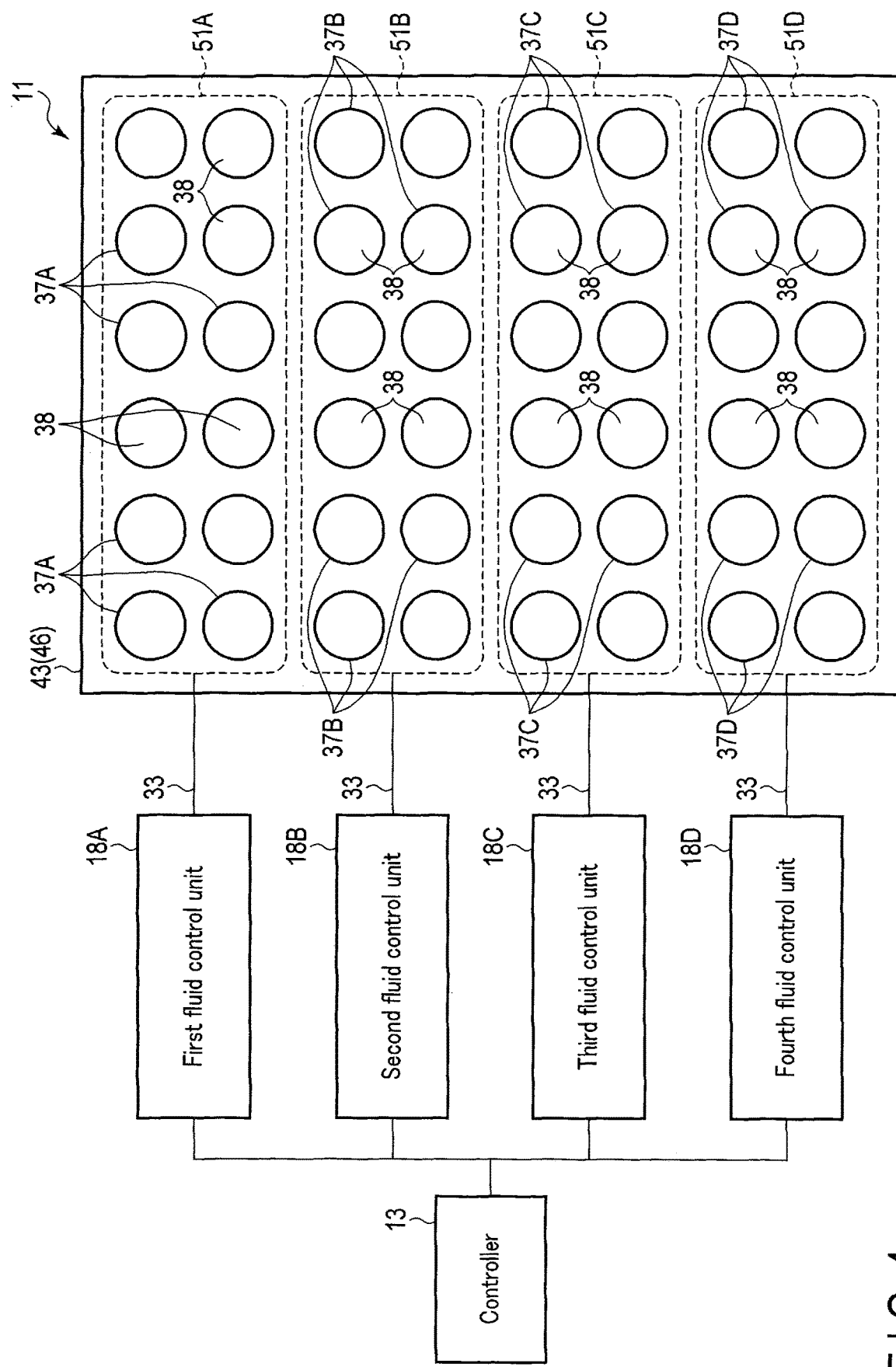
F I G. 4

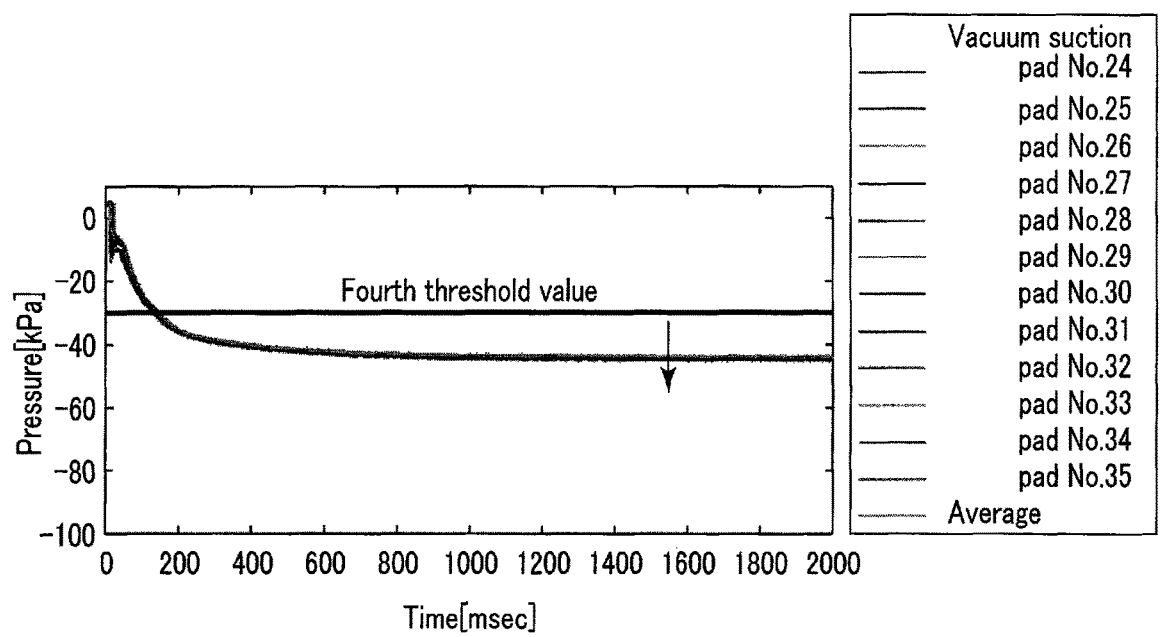
F I G. 10
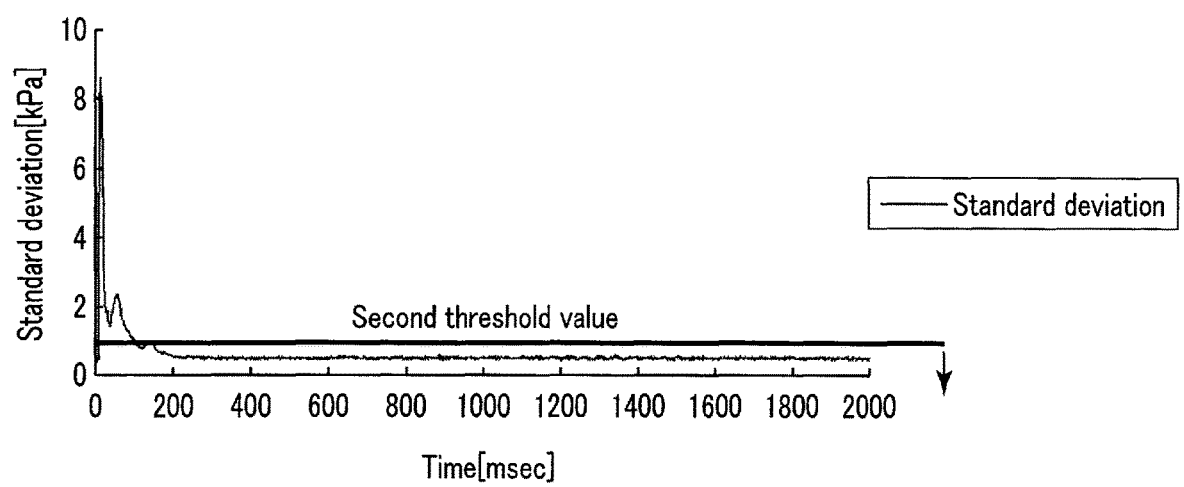
F I G. 11

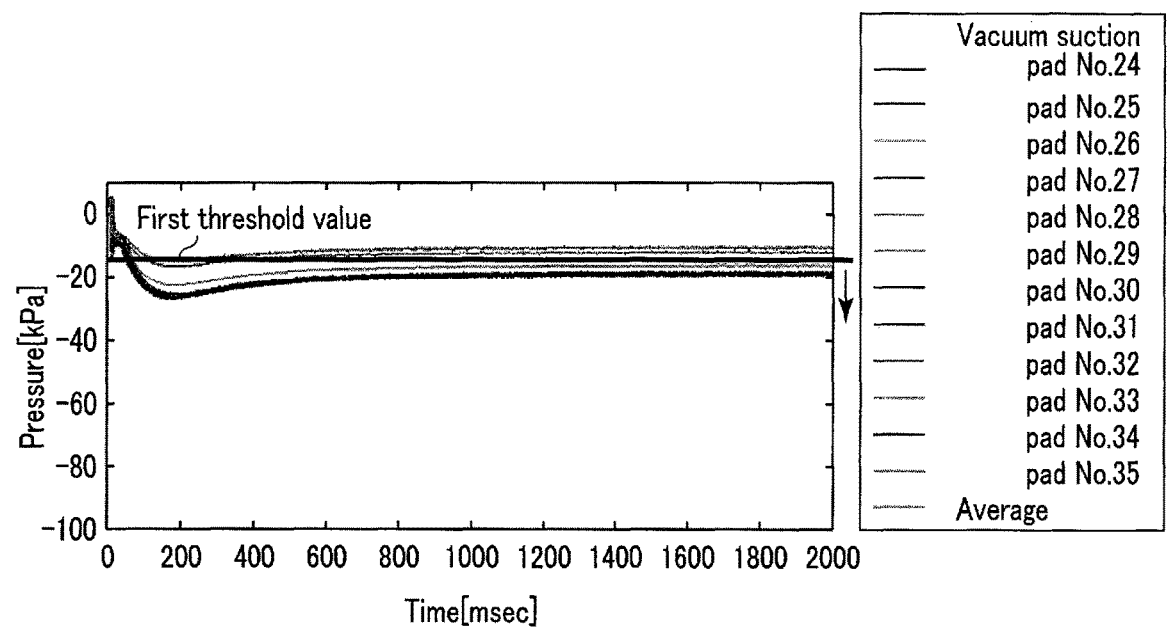
F I G. 12
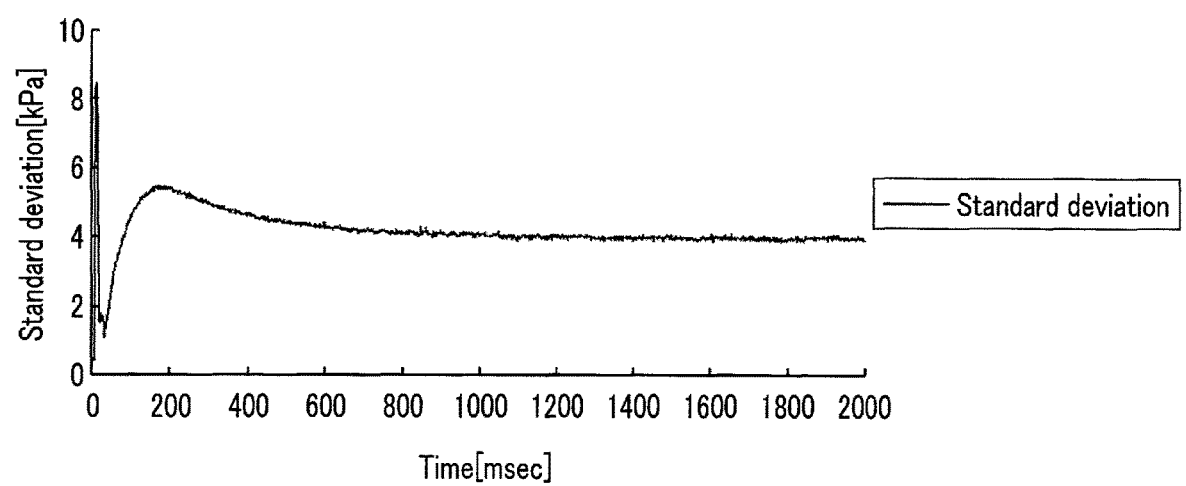
F I G. 13

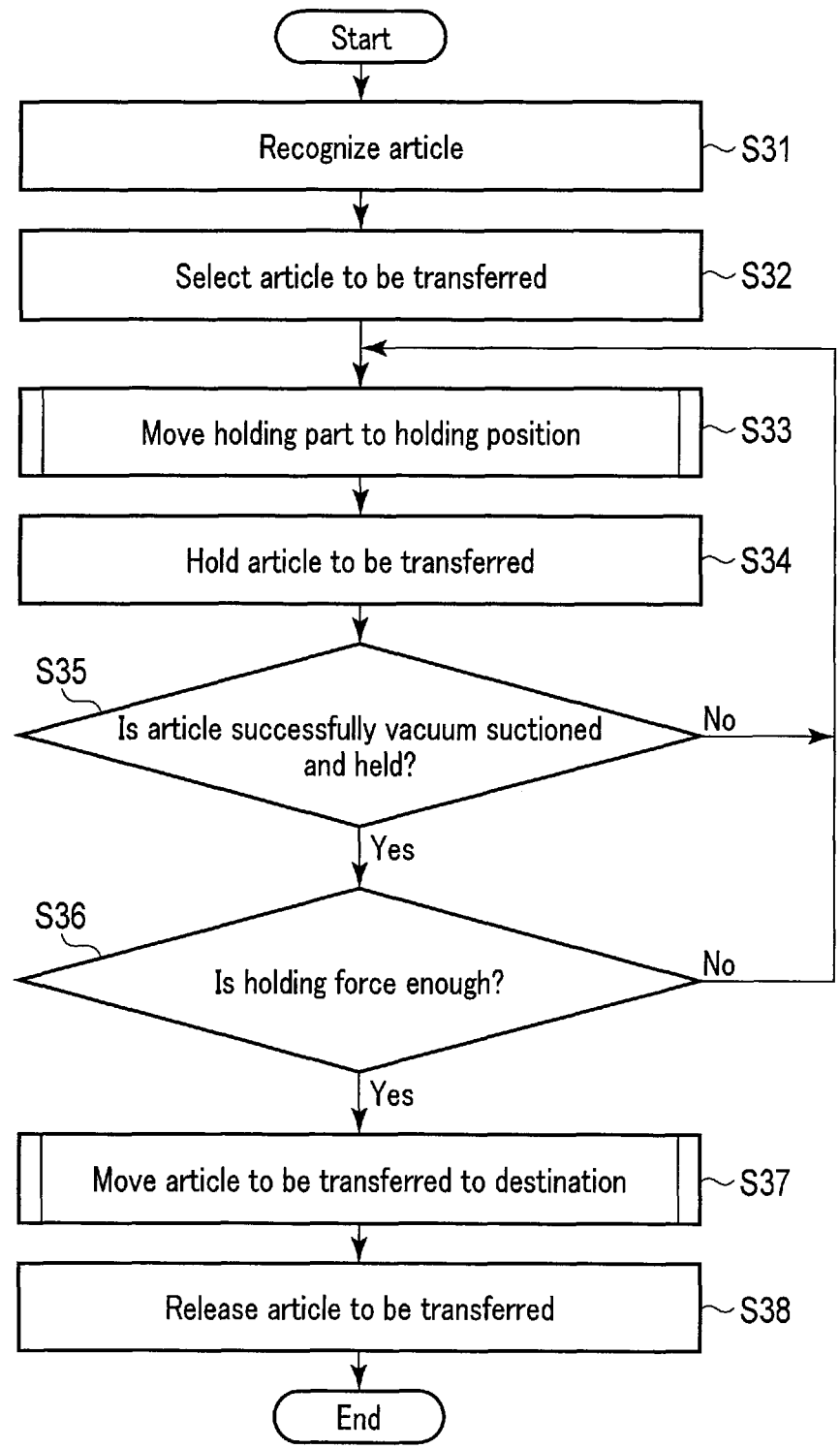
F I G. 24

TRANSFER EQUIPMENT AND DETERMINATION METHOD

CROSS-REFERENCE TO RELATED APPLICATION

This application is based upon and claims the benefit of priority from Japanese Patent Application No. 2017-143390, filed Jul. 25, 2017, the entire contents of which are incorporated herein by reference.

FIELD

Embodiments described herein relate generally to transfer equipment that can transfer articles to a destination and a determination method for use in the transfer equipment.

BACKGROUND

There is transfer equipment that transfers a workpiece using an vacuum suction pad or the like. This transfer equipment can transfer various workpieces of different dimensions by adsorbing and gripping the workpieces.

BRIEF DESCRIPTION OF THE DRAWINGS

FIG. 2 is a schematic diagram showing a fluid control unit and a controller in the transfer equipment shown in FIG. 1.

FIG. 4 is a schematic diagram showing first to fourth fluid control units and the holding part and first to fourth vacuum suction parts in the transfer equipment shown in FIG. 1.

FIG. 10 is a graph showing the measured value of pressure of each vacuum suction pad and the fourth threshold value when a negative pressure is applied to twelve vacuum suction parts and all the vacuum suction parts is successfully adsorbed in the transfer equipment shown in FIG. 1.

FIG. 11 is a graph showing the standard deviation of the measured value of pressure of each vacuum suction pad and the second threshold value when a negative pressure is applied to twelve vacuum suction parts and all the vacuum suction parts is successfully adsorbed in the transfer equipment shown in FIG. 1.

FIG. 12 is a graph showing the measured value of pressure of each vacuum suction pad and the first threshold value when a negative pressure is applied to twelve vacuum suction parts and eight of the vacuum suction parts are successfully adsorbed in the transfer equipment shown in FIG. 1.

FIG. 13 is a graph showing the standard deviation of the measured value of pressure of each vacuum suction pad when a negative pressure is applied to twelve vacuum suction parts and eight of the vacuum suction parts are successfully adsorbed in the transfer equipment shown in FIG. 1.

FIG. 24 is a flowchart showing an operation of the transfer equipment according to the third embodiment.

DETAILED DESCRIPTION

Figure 1:
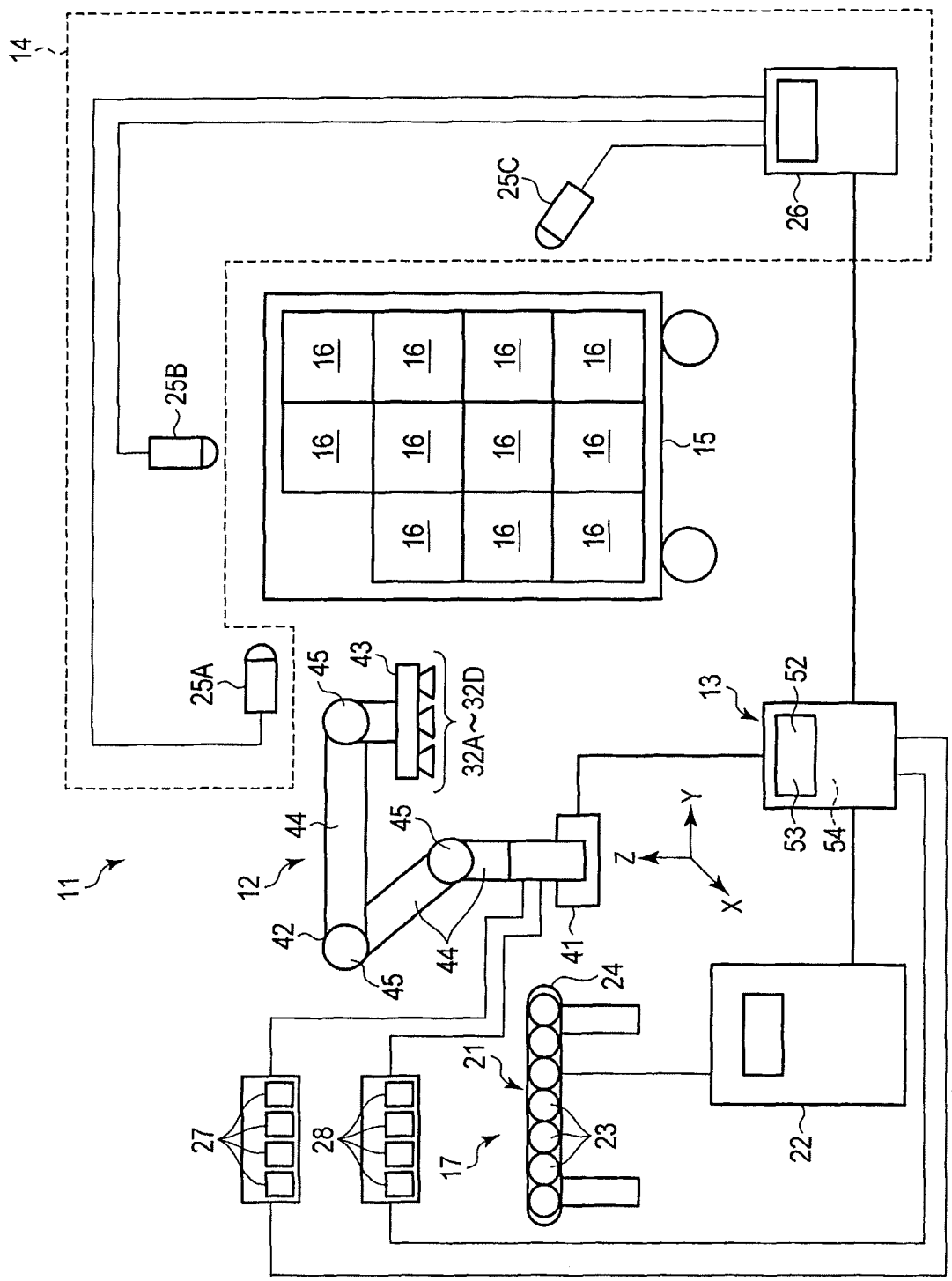
FIG. 1 is a schematic diagram showing transfer equipment according to a first embodiment.

According to one embodiment, transfer equipment includes: a first negative-pressure generation source; a plurality of first vacuum suction parts; a sensor part; and a first determination circuit. The first vacuum suction parts each connected to the first negative-pressure generation source and configured to adsorb an article by a negative pressure introduced from the first negative-pressure generation source. The sensor part configured to acquire a plurality of measured values corresponding to the negative pressure of each of the first vacuum suction parts. The first determination circuit configured to set a first threshold value based on the measured values and determine an vacuum suction state of the first vacuum suction parts corresponding to the measured valued based on the first threshold value and the measured values.

In the field of distribution and logistics, recently, the handling number of articles (objects, packages, workpieces) has increased due to the expansion of mail order. In Japan, a labor shortage is feared on the grounds of declining birthrate and aging population, and there is a rapidly growing need for labor saving and automatization in the logistics field. In the advanced distribution centers, for example, warehouse storage and entering/dispatching operations and transporting and sorting operations have conventionally been automated by utilizing material handling equipment. However, unloading and picking operations require handling a large variety of packages quickly and stably and are still depending on manpower. In home-delivery companies, a commonly called "roll box pallet" is used a lot to improve the efficiency of conveyance and transfer operations. The roll box pallet is so configured that its three faces are surrounded by a fence and its one face is opened. As one operation that is desired to be automated, there is an unloading operation of unloading a large variety of packages of several kilograms to several tens of kilograms in sequence from a roll box pallet onto a conveyor. Since the unloading operation requires maintaining workers' handling ability at a fixed level over a long time, their physical and mental burden increases. Automatic equipment requires article handling techniques of performing an article handling operation in the same manner as or more quickly and more stably than the workers.

Most automatic equipment as described above, which performs an operation of unloading box packages such as corrugated cardboard boxes, is so configured that a holding mechanism for holding an object is disposed at the distal end of an articulated manipulator of an industrial robot or the like. The holding mechanism holds packages loaded in a plurality of rows and in a plurality of stages and conveys them in sequence from the above to achieve the unloading operation. As the holding mechanism of transfer equipment to hold and move packages, a gripper system in which an object is caught by a plurality of finger sections and a vacuum system using a vacuum pad are widely adopted. The gripper system includes a plurality of finger sections that come into contact with and are separated from one another. As the interval between the finger sections decreases, the finger sections are brought into contact with an object, with the result that the object is caught between the finger sections and thus held. In the gripper system, a large variety of objects can be held because the objects are caught by the friction force. In the vacuum system, the pressure of internal space between a package and a vacuum pad, which are in contact with each other, is lowered by discharging air from the internal space to differ from the atmospheric pressure and hold the package, with the result that the holding mechanism can hold a package the size of which is larger than that of the holding mechanism. Under circumstances where the size of packages is unknown, the vacuum system using a vacuum pad is widely adopted chiefly as the holding mechanism. The holding mechanism is supposed to vacuum and hold the top surface of a package using a plurality of vacuum pads, and the vacuum pads are disposed on the bottom surface of a flat plane.

Embodiments will be described below with reference to the accompanying drawings. The transfer equipment according to each of the embodiments is the foregoing vacuum-system transfer equipment. Throughout the drawings, like components are provided with like reference symbols and their overlapping descriptions are omitted. The drawings are schematic or conceptual and the dimensions of the components shown in the drawings are not necessarily the same as the actual ones.

First Embodiment

A first embodiment will be described with reference to FIGS. 1-15. In the following descriptions, the horizontal plane direction is defined as an X-axis direction and a Y-axis direction, and the vertical direction is defined as a Z-axis direction.

As shown in FIGS. 1 and 4, transfer equipment 11 includes a manipulator part 12, a controller 13, a recognition unit 14, a placement section 15 on which articles to be transferred are placed, articles 16 placed on the placement section 15, a conveyance unit 17 to which the articles 16 are transferred, and first to fourth fluid control units 18A to 18D connected in parallel to the controller 13. The articles 16 include products in a corrugated cardboard box and the like, packaged products, and products themselves.

As shown in FIG. 1, the conveyance unit 17 receives the articles 16 from the manipulator part 12 and conveys them. The conveyance unit 17 includes a conveyor belt 21, a conveyance control unit 22 connected to the conveyor belt 21 to control the operation of the conveyor belt 21, and the like. The conveyor belt 21 includes a plurality of rollers 23 arranged in a predetermined direction and a belt 24 wound on the rollers 23. The conveyor belt 21 rotates the rollers 23 in a predetermined direction to drive the belt 24 and thus convey the articles 16. The conveyance unit 17 is not limited to the conveyor belt 21 but may include a roller conveyor, a sorter and the like.

The conveyance control unit 22 controls the driving of the conveyor belt 21, such as the conveyance speed and conveyance direction thereof. The conveyance control unit 22 is connected to the controller 13 to exchange signals therebetween. The conveyance control unit 22 is a computer including a CPU, a ROM, a RAM, a memory, an auxiliary storage unit, a hard disk drive and the like. Programs are installed in advance in the conveyance control unit 22. The programs enable the conveyance control unit 22 to control the conveyance unit 17 as automatic equipment. The conveyance unit 17 can be controlled by operating the conveyance control unit 22 manually by an operator. The conveyance control unit 22 can be included in the controller 13.

The placement section 15 is a place on which the articles 16 are stacked or placed. The placement section 15 may include a rack, a roll box pallet, a steel cart, a box pallet, a pallet and the like. The placement section 15 can be configured to move.

As shown in FIG. 1, the recognition unit 14 includes first to third image sensors 25A to 25C and a calculator 26 connected to each of the first to third image sensors 25A to 25C. The recognition unit 14 recognizes the articles 16 placed on the placement section 15. The calculator 26 is connected to the controller 13 to allow various signals to be exchanged therebetween.

The first image sensor 25A is, for example, located in front of and obliquely upward above the articles 16 placed on the placement section 15. The second image sensor 25B is, for example, located above the articles 16 placed on the placement section 15. The third image sensor 25C is, for example, located behind and obliquely downward above the articles 16 placed on the placement section 15. The first to third image sensors 25A to 25C can be configured to move. The first to third image sensors 25A to 25C can be configured by a camera capable of three-dimensional positioning, such as a range image sensor and an infrared dot pattern projection system camera. The infrared dot pattern projection system camera projects an infrared dot pattern on the articles 16 placed on the placement 15 and picks up infrared images of the articles 16. The calculator 26 analyzes the infrared images acquired from the first to third image sensors 25A to 25C to obtain three-dimensional information of the articles 16. The infrared dot pattern projection system camera may pick up a color image or a black-and-white image. The first to third image sensors 25A to 25C can be configured by an optical sensor such as a camera that picks up a color image or a black-and-white image as well as the infrared dot pattern projection system camera. The images may include commonly-used image data such as jpg, gif, png and bmp. In the first embodiment, the number of image sensors is not limited to three, but may be at least one or two or more.

The calculator 26 calculates three-dimensional location information of the articles 16 based on data output from the first to third image sensors 25A to 25C. The three-dimensional location information of the articles 16 is supplied to the controller 13. The calculator 26 is configured by a commonly-used computer and includes, for example, a CPU, a memory and an auxiliary storage unit to execute programs and the like. Note that the calculator 26 can be all or partly achieved using hardware such as ASIC, PLD and FPGA. The calculator 26 can be included in the controller 13. The controller 13 controls the manipulator part 12 based on the location information of the articles 16.

In the first embodiment, as shown in FIG. 4, the first to fourth fluid control units 18A to 18D are connected in parallel to one controller 13; however, each of the first to fourth fluid control units 18A to 18D may include one controller 13. As shown in FIG. 2, the first fluid control unit 18A includes a suction unit 27, a pressurization unit 28, a direction control valve 31, a plurality of (e.g. twelve) tubes 33 connected to a first vacuum suction unit 32A corresponding to the first fluid control unit 18A, and a plurality of (e.g. twelve) sensor parts 34. The second to fourth fluid control units 18B to 18D each have the same configuration as that of the first fluid control unit 18A. In the second fluid control unit 18B, a plurality of (e.g. twelve) tubes 33 are connected to a second vacuum suction unit 32B corresponding to the second fluid control unit 18B. In the third fluid control unit 18C, a plurality of (e.g. twelve) tubes 33 are connected to a third vacuum suction unit 32C corresponding to the third fluid control unit 18C. In the fourth fluid control unit 18D, a plurality of (e.g. twelve) tubes 33 are connected to a fourth vacuum suction unit 32D corresponding to the fourth fluid control unit 18D.

The suction unit 27 of each of the first to fourth fluid control units 18A to 18D is configured by a commonly-used vacuum pump. The suction unit 27 can apply a negative pressure to each of the first to fourth vacuum suction parts 32A to 32D, as will be described later. The suction unit 27 may generate a negative pressure by combining the pressurization unit 28 with a vacuum generator without using the vacuum pump. The suction unit 27 of the first fluid control unit 16A corresponds to a first negative-pressure generation source, the suction unit 27 of the second fluid control unit 18B corresponds to a second negative-pressure generation source, the suction unit 27 of the third fluid control unit 18C corresponds to a third negative-pressure generation source, and the suction unit 27 of the fourth fluid control unit 18D corresponds to a fourth negative-pressure generation source. The first to fourth negative-pressure generation sources are independent. For the sake of convenience, the second to fourth negative-pressure generation sources will be all referred to as a second negative-pressure generation source.

The pressurization unit 28 is configured by a commonly-used compressor, a pneumatic pump (air pump) or the like. The first and second vacuum suction parts 32A and 32B can be supplied with air pressure (positive pressure) for a vacuum break, as will be described later. As the pressurization unit 28, the compressor or the pneumatic pump can be substituted with an air pipe in a factory, from which high-pressure air can be obtained. The tubes 33 are formed cylindrically by elastic materials. The tubes 33 are stiff enough to be resistant to a vacuum. It is desirable that the tubes 33 be flexible.

Each of the sensor parts 34 is provided halfway through its corresponding one of the tubes 33. The sensor parts 34 are configured by commonly-used pressure sensors to measure the internal pressure (including a negative pressure) of the tubes 33. The sensor parts 34 can be configured by flow sensors in place of the pressure sensors or configured by both the pressure sensors and the flow sensors.

As shown in FIG. 2, the direction control valve 31 is a manifold-shaped solenoid valve as a whole and includes a plurality of flow paths 35 branching off therein and a plurality of valve portions 36 provided halfway through their respective flow paths 35. The direction control valve 31 can thus supply a plurality of tubes 33 with a negative pressure from, for example, one suction unit 27. Under the control of the controller 13, the valve portions 36 are opened and closed by the function of the solenoid valve to allow switching between supply and non-supply of a negative pressure to one tube 33. Similarly, the direction control valve 31 can supply a plurality of tubes 33 with air pressure (positive pressure) from, for example, one pressurization unit 28. Under the control of the controller 13, the function of the solenoid valve allows switching between supply and non-supply of a negative pressure to one tube 33. The direction control valve 31 is not limited to the solenoid valve but has only to operate by air pressure or hydraulic pressure. The pressurization unit 28 and the suction unit 27 are connected to one end of the direction control valve 31. The direction control valve 31 can selectively be connected to the pressurization unit 28 or the suction unit 27. The other end of the direction control valve 31 communicates with the internal spaces 38 of first to fourth vacuum suction pads 37A to 37D through the tubes 33.

As shown in FIG. 1, the manipulator part 12 includes a base stand 41, a manipulator body 42 attached to the base stand 41 and a holding part 43 capable of holding the articles 16 disposed in front of the distal end of the manipulator body 42. The manipulator body 42 includes a plurality of (e.g. at least two) rod-shaped links 44 and a plurality of joint units 45 that connect the links 44 at their ends. In the first embodiment, the joint units 45 can be rotated in one-axial direction, but the rotation direction of the joint units 45 is not limited to the one-axial direction. The joint units 45 can be rotated in multi-axial direction. The joint units 45 can be moved linearly without limiting its movement to rotation. The manipulator body 42 is one example of a movement mechanism that can move the holding part 43 from a first location opposed to the articles 16 (placement section 15) to a second location of the destination (conveyance unit 17).

The joint units 45 each include, for example, a rotating shaft, a motor disposed coaxially with the rotating shaft, a measurement sensor (detector) which senses a driving state of the motor, and a reducer that reduces the rotational speed of the motor and increases torque. The manipulator body 42 can rotate each of the links 44 by driving the motor. Accordingly, the manipulator body 42 moves the holding part 43 disposed at the distal end of the manipulator body 42. The manipulator body 42 is what is called a vertical articulated robot. The manipulator body 42 may have a linear motion mechanism of three-axis (X, Y and Z axes) direction in addition to the above configuration or may have a combination of the mechanism and the configuration.

The measurement sensor (detector) is configured by, for example, a potentiometer and a rotary encoder which measures a rotation angle (rotation displacement), the number of rotations, a speed, a load, etc. of the motor to measure a driving state of the motor. As the detector, the potentiometer and the rotary encoder can be substituted with another sensor if it can detect a driving state of the motor. The measurement sensor (detector) may include a displacement sensor, an ultrasonic sensor, a variable resistor, a capacitance sensor, a pulse coder, a fiber sensor, a laser displacement sensor, a current sensor and the like. The measurement sensor (detector) may also include a sensor that outputs a voltage or a current in accordance with the angle and distance from a reference point. Information measured by these sensors is sent to the controller 13. The reducer reduces the number of rotations of the motor and sets the number of rotations of the joint portions 45. The reduction ratio is adjusted appropriately by the number of rotations of the motor, the generated torque of the motor and the like. If the number of rotations and the torque generation are adjusted on the motor side, the reducer is not an essential configuration.

As shown in FIG. 1, the base stand 41 is configured to fix one end of the manipulator body 42 and support the manipulator body 42 rotatably on the Z axis. The base stand 41 is placed on the floor, ground or the like. Alternatively, the base stand 41 can be configured by a movable hand truck or the like. When the base stand 41 moves on the floor, the manipulator part 12 can be moved.

Figure 3:
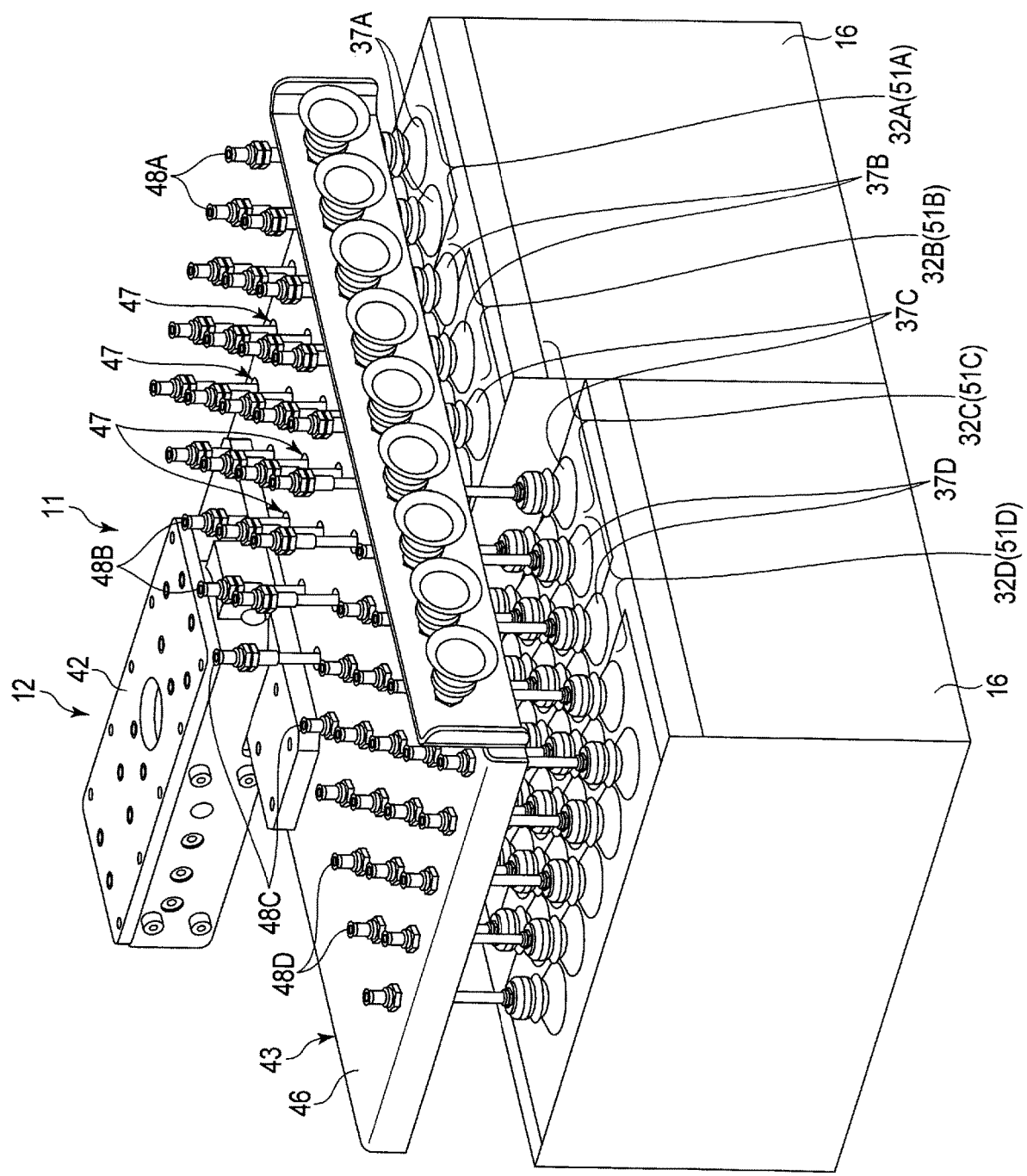
FIG. 3 is a perspective view showing a manipulator body, a holding part, first to fourth vacuum suction parts and two articles that differ in level in the transfer equipment shown in FIG. 1.

As shown in FIGS. 1 and 3, when the manipulator body 42 move, the holding part 43 can be moved in the direction of the articles 16. The holding part 43 includes a square-shaped flat plate 46, a plurality of first vacuum suction parts 32A attached to the flat plate 46, a plurality of second vacuum suction parts 32B attached to the flat plate 46, a plurality of third vacuum suction parts 32C attached to the flat plate 46 and a plurality of fourth vacuum suction parts 32D attached to the flat plate 46. The holding part 43 includes a plurality of through holes 47 provided like lattice points. The first shaft 48A of each of the first vacuum suction parts 32A is inserted into its corresponding one of the through holes 47, the second shaft 48B of each of the second vacuum suction parts 32B is inserted into its corresponding one of the through holes 47, the shaft 48C of each of the third vacuum suction parts 32C is inserted into its corresponding one of the through holes 47 and the shaft 48D of each of the fourth vacuum suction parts 32D is inserted into its corresponding one of the through holes 47. Note that the second to fourth vacuum suction parts 32B to 32D all correspond to the second vacuum suction part recited in the claims.

The first vacuum suction parts 32A, second vacuum suction parts 32B, third vacuum suction parts 32C and fourth vacuum suction parts 32D can be moved forward and backward along the direction of the normal to the plane of the flat plate 46 through the through holes 47 and the first shafts 48A (second shafts 48B, third shafts 48C and fourth shafts 48D). There are a lot of the first vacuum suction parts 32A, the second vacuum suction parts 32B, the third vacuum suction parts 32C, and the fourth vacuum suction parts 32D in the holding part 43. The first vacuum suction parts 32A make up a first vacuum suction part group 32A. Similarly, the second vacuum suction parts 32A make up a second vacuum suction part group 32B, the third vacuum suction parts 32C make up a third vacuum suction part group 32C and the fourth vacuum suction parts 32D make up a second vacuum suction part group 32D.

As shown in FIGS. 2 and 3, the first vacuum suction parts 32A each include a first vacuum suction pad 37A that is shaped like a bowl to have an internal space 38, a cylindrical first shaft 48A communicating with the first vacuum suction pad 37A and a suspension (spring) interposed between a portion close to the lower end of the first shaft 48A and the bottom surface of the holding part 43. The second vacuum suction parts 32B each include a second vacuum suction pad 37B that is shaped like a bowl to have an internal space 38 (second internal space), a cylindrical second shaft 48B communicating with the second vacuum suction pad 37B and a second suspension (spring) interposed between a portion close to the lower end of the second shaft 48B and the bottom surface of the holding part 43. The third vacuum suction parts 32C each include a third vacuum suction pad 37C that is shaped like a bowl to have an internal space 38 (third internal space), a cylindrical third shaft 48C communicating with the third vacuum suction pad 37C and a third suspension (spring) interposed between a portion close to the lower end of the third shaft 48C and the bottom surface of the holding part 43. The fourth vacuum suction parts 32D each include a fourth vacuum suction pad 37D that is shaped like a bowl to have an internal space 38 (fourth internal space), a cylindrical fourth shaft 48D communicating with the fourth vacuum suction pad 37D and a fourth suspension (spring) interposed between a portion close to the lower end of the fourth shaft 48D and the bottom surface of the holding part 43. The first to fourth vacuum suctions pads 37A to 37D are each formed of a rubber-like elastic body.

Each of the first, second, third and fourth shafts 48A, 48B, 48C and 48D is connected to its corresponding tube 33. The first vacuum suction unit 32A is supplied with a negative pressure and an air pressure (positive pressure) from the suction unit 27 and pressurization unit 28 of the first fluid control unit 18A. The second vacuum suction unit 32B is supplied with a negative pressure and an air pressure (positive pressure) from the suction unit 27 and pressurization unit 28 of the second fluid control unit 18B. The third vacuum suction unit 32C is supplied with a negative pressure and an air pressure (positive pressure) from the suction unit 27 and pressurization unit 28 of the third fluid control unit 18C. The fourth vacuum suction unit 32D is supplied with a negative pressure and an air pressure (positive pressure) from the suction unit 27 and pressurization unit 28 of the fourth fluid control unit 18D. Thus, the sources for supplying a negative pressure and an air pressure (positive pressure) to the first to fourth vacuum suction parts 32A to 32D are independent of one another (different in system from one another).

FIG. 4 shows a plurality of vacuum suction pad groups included in the holding part 43. The holding part 43 includes first to fourth vacuum suction pad groups 51A to 51D. The first vacuum suction pad group 51A includes a plurality of (e.g. twelve) first vacuum suction pads 37A. The second vacuum suction pad group 51B includes a plurality of (e.g. twelve) second vacuum suction pads 37B. The third vacuum suction pad group 51C includes a plurality of (e.g. twelve) third vacuum suction pads 37C. The fourth vacuum suction pad group 51D includes a plurality of (e.g. twelve) fourth vacuum suction pads 37D. Note that the second, third and fourth vacuum suction pads 37B, 37C and 37D in the first embodiment correspond to the second vacuum suction pad recited in the claims. The number of vacuum suction pad groups and the number of vacuum suction pads included in each vacuum suction pad group are each optional and can be varied appropriately depending on the intended use.

As shown in FIG. 4, the first vacuum suction pads 37A included in the first vacuum suction pad group 51A are connected to the first fluid control unit 18A (direction control valve 31) through the tube 33. The second vacuum suction pads 37B included in the second vacuum suction pad group 51B are connected to the second fluid control unit 18B (direction control valve 31) through the tube 33. The third vacuum suction pads 37C included in the third vacuum suction pad group 51C are connected to the third fluid control unit 18C (direction control valve 31) through the tube 33. The fourth vacuum suction pads 37D included in the fourth vacuum suction pad group 51D are connected to the fourth fluid control unit 18D (direction control valve 31) through the tube 33. Note that the holding part 43 is not limited to the foregoing configuration but can be configured by, for example, one first vacuum suction pad group 51A.

As shown in FIG. 3, when the first to fourth shafts 48A to 48D and the first to fourth suspensions adsorb and hold two or more articles 16 that differ in level, they can absorb the difference in level between the articles 16. In other words, when the level of the articles 16 is low, the first to fourth shafts 48A to 48D protrude greatly from the holding part 43 and the protrusion state is maintained by the operation of the first to fourth suspensions. When the level of the articles 16 is high, the amount of protrusion of the first to fourth shafts 48A to 48D is decreased and the protrusion state is maintained by the operation of the first to fourth suspensions. This configuration makes it possible to absorb the difference in level between the articles 16 and adsorb and hold the level-difference articles 16 at once. Note that the first to fourth suspensions are not a configuration that is essential to the vacuum suction parts. Unless the first to fourth suspensions are provided, it is only the amount of deformation of the rubber-like elastic bodies of the vacuum suction pads that absorbs a difference in level between the articles 16.

As shown in FIGS. 1 and 2, the controller 13 is connected to the manipulator body 12, the direction control valves 31 of the first to fourth fluid control units 18A to 18D, the pressurization unit 28 and the suction unit 27 and controls them.

Figure 5:
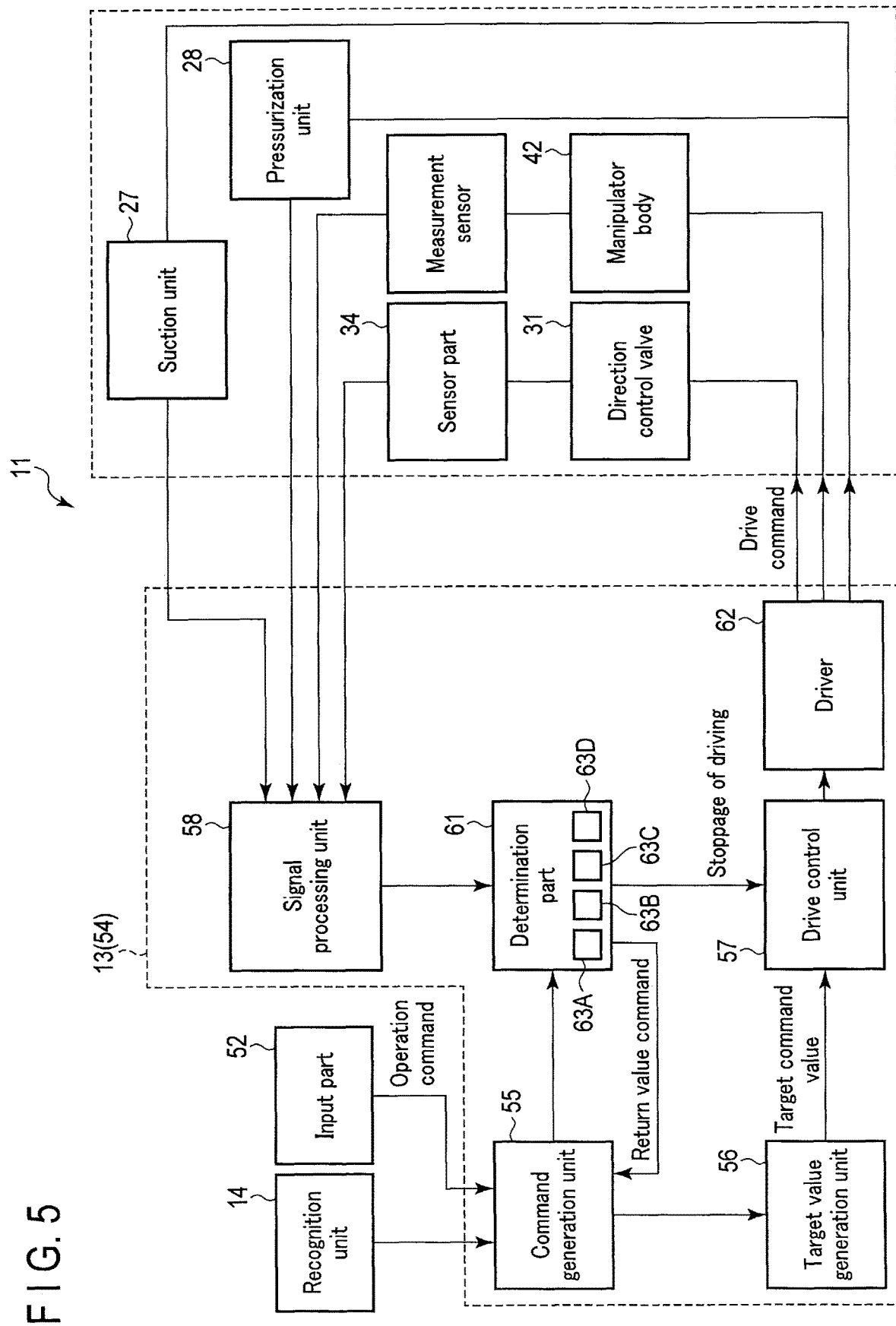
FIG. 5 is a block diagram showing a configuration of the main body of the controller in the transfer equipment shown in FIG. 1.

As shown in FIG. 5, the controller 13 includes an input part 52, a display unit 53 and a controller body 54. The controller body 54 is configured by a commonly-used computer. In other words, the controller body 54 includes, for example, a CPU, a ROM, a RAM, various drivers, and a printed wiring board on which they are mounted and which electrically connects them. The controller 13 may also include a storage device such as a hard disk drive. Note that all or part of the controller body 54 can be attained using hardware such as an application specific integrated circuit (ASIC), a programmable logic device (PLD) and a field programmable gate array (FPGA).

As the storage device, for example, a tape system such as a magnetic tape and a cassette tape, a disk system including an optical disk such as a CD-ROM, MO, an MD, a DVD and a CD-R, a card system such as an IC card (including a memory card) and an optical card, and a semiconductor memory system such as a mask ROM, an EPROM, an EEPROM (registered trademark) and a flash ROM can be used. The controller body 54 includes a command generation unit 55, a target value generation unit 56 that generates a target command value, a drive control unit 57, a signal processing unit 58 and a determination part 61 as functions. These functions of the controller body 54 can be fulfilled by software installed into a hard disk drive and the like or by hardware such as chip parts of various ICs mounted on the printed wiring board, a CPU, a ROM, a RAM, a hard disk drive and other circuits.

The input part 52 is configured as, e.g. a touch panel integrally with the display unit 53 and can receive an operator's (user's) instruction. The input part 52 can be attained by a keyboard provided separately from the display unit 53. The input part 52 can be physically separated from the controller 13 and attained as a remote controller by which an operator can input his or her instruction from a remote place wirelessly or by wire. The input part 52 can be also configured by a microphone and, in this case, an operator can input his or her instruction by voice. The input part 52 is supplied with operation command information for the manipulator body 12. The input part 52 transmits the operation command information to the command generation unit 55. The input part 52 is not always an essential configuration if the transfer equipment 11 drives the recognition unit 14 to recognize the articles 16 automatically.

The input part 52 functions as a communication unit when the controller body 54 communicates with an external device wirelessly. The input part 52 receives operation command information from an external computer and a server. Though it is desirable that the input part 52 be configured by a wireless communication device, it can be connected to a communication network. As the communication network, for example, the Internet, an intranet, an extranet, a LAN, an ISDN, a VAN, a CATV communication network, a virtual private network, a telephone network, a mobile communication network and a satellite communication network can be used. A transmission medium constituting a communication network is not particularly limited, and wire such as IEEE 1394, a USB, a power-line carrier, a cable TV line, a telephone line and an ADSL line and wireless such as infrared rays of the IrDA, a remote controller, etc., Bluetooth (registered trademark), 802.11 wireless, an HDR, a mobile telephone network, a satellite circuit, a digital terrestrial television network can be used.

The command generation unit 55 generates an operating procedure, which is required for each operation process, as an operation command on the basis of the operation command information and the recognition results of the articles 16 obtained by the recognition unit 14. The command generation unit 55 generates operating mode information corresponding to each operation command to be executed. The operation command is a command regarding a series of operations of the manipulator part 12 and is, for example, information as a program. The operating mode information is information about individual operations and is, for example, information about operations of lifting and lowering the holding part 43. The command generation unit 55 causes a RAM and a storage device to store the operating mode information and the like. The storage device may also prestore attribute data of the shape, weight, flexibility, etc. of the articles 16 to be held.

The command generation unit 55 outputs the operation command to the target value generation unit 56. The command generation unit 55 outputs operating modes of the operation command and the actual operation information stored in the storage device, which are associated with each other, to the determination part 61.

The target value generation unit 56 receives operation commands for the manipulator body 42 and the holding part 43 from the command generation unit 55. The target value generation unit 56 generates target command values of the manipulator body 42 and the holding part 43. The target command values are output to the drive control unit 57.

The drive control unit 57 receives the target command values of the manipulator body 42 and the holding part 43 from the target value generation unit 56 and generates drive command information for driving the manipulator body 42 and the holding part 43 in response to the target command values. The drive command information is output to a driver 62.

The driver 62 receives the drive command information of the manipulator body 42 and the holding part 43 from the drive control unit 57 and generates a driving force. The manipulator body 42 and the holding part 43 receive the driving force from the driver 62 and operate the direction control valve 31, the motor and the like to adjust the amount of driving.

The signal processing unit 58 receives signals of various sensors (e.g. sensors attached to the sensor parts, pressurization units and suction units) by driving the manipulator body 42 and the holding part 43, and performs a signal amplification process, an analog to digital conversion process and the like in response to the signals.

The determination part 61 is supplied with a sensor signal converted by the signal processing unit 58. In response to the sensor signal, the determination part 61 determines the adjustment of the amount of driving of the holding part 43, the presence or absence of an inclination of the placed articles 16, the position of the articles 16, the holding state of the articles 16 and the like. The determination part 61 includes first to fourth determination circuits 63A to 63D which will be described later. The determination part 61 receives operation information of the manipulator body 42 and the holding part 43, which corresponds to the operation command, from the command generation unit 55. The determination part 61 compares the operation information with information of the sensor signal. Based on a result of the comparison, the determination part 61 generates an operation command such as stoppage of the driving of the manipulator body 42 and the holding part 43 and correction of the position of the manipulator body 42 corresponding to the state of the articles. The determination part 61 supplies the command generation unit 55 with a return value command to correct the operation command. In response to the return value command, the command generation unit 55 can correct the operation command and perform a processing operation that is suitable for the operation command information input by the input part. The determination part 61 outputs a control signal for stoppage of the driving to the drive control unit 57 when the received operation information and sensor signal conform to or almost conform to target values. These control operations improve the reliability and certainty of the operation of the holding part 43.

An example of an operation of the transfer equipment 11 according to the first embodiment will be described with reference to FIGS. 6 to 13.

When the transfer equipment 11 is powered on, the controller body 54 activates the suction units 27 and pressurization units 28 of the first to fourth fluid control units 18A to 18D. Accordingly, the suction units 27 each generate a negative pressure and the pressurization units 28 each generate an air pressure (positive pressure). The activation of the suction units 27 and pressurization units 28 need not always be associated with that of the transfer equipment 11. For example, the suction units 27 can be activated individually by hand and so can be the pressurization units 28. The controller 13 controls the direction control valves 31 to switch the flow paths 35 therein to a direction in which the first to fourth vacuum suction parts 32A to 32D are connected to their respective suction units 27. Thus, the pressures supplied from the suction units 27 of the first to fourth fluid control units 18A to 18D operate on the first to fourth vacuum suction parts 32A to 32D, respectively. The sensor parts 34 acquire measured values (reference values) of pressure regarding all the first to fourth vacuum suction parts 32A to 32D while the first to fourth vacuum suction parts 32A to 32D are not adsorbed on the articles 16 (idle suction state). When the number of vacuum suction parts belonging to, e.g. the first vacuum suction unit 32A is twelve, not only the sensor parts 34 acquire measured values (reference values) of pressure of twelve idle suction states, but also the vacuum suction parts may acquire measured values (reference values) of pressure of eleven to one idle suction state. More specifically, when the number of vacuum suction parts belonging to, e.g. the first vacuum suction unit 32A in a target area 64 is eight, the vacuum suction/non-vacuum suction determination precision is improved further by performing a calibration using the measured values (reference values) of pressure of the idle suction state, which are acquired when the number of vacuum suction parts is eight. Each of the reference values may be one of values measured for a fixed time and an average value of values measured for a fixed time. The sensor parts 34 cause the storage device to store the acquired reference values. Note that the reference values can be stored inside the sensor part 34. These previous preparations are completed.

Figure 6:
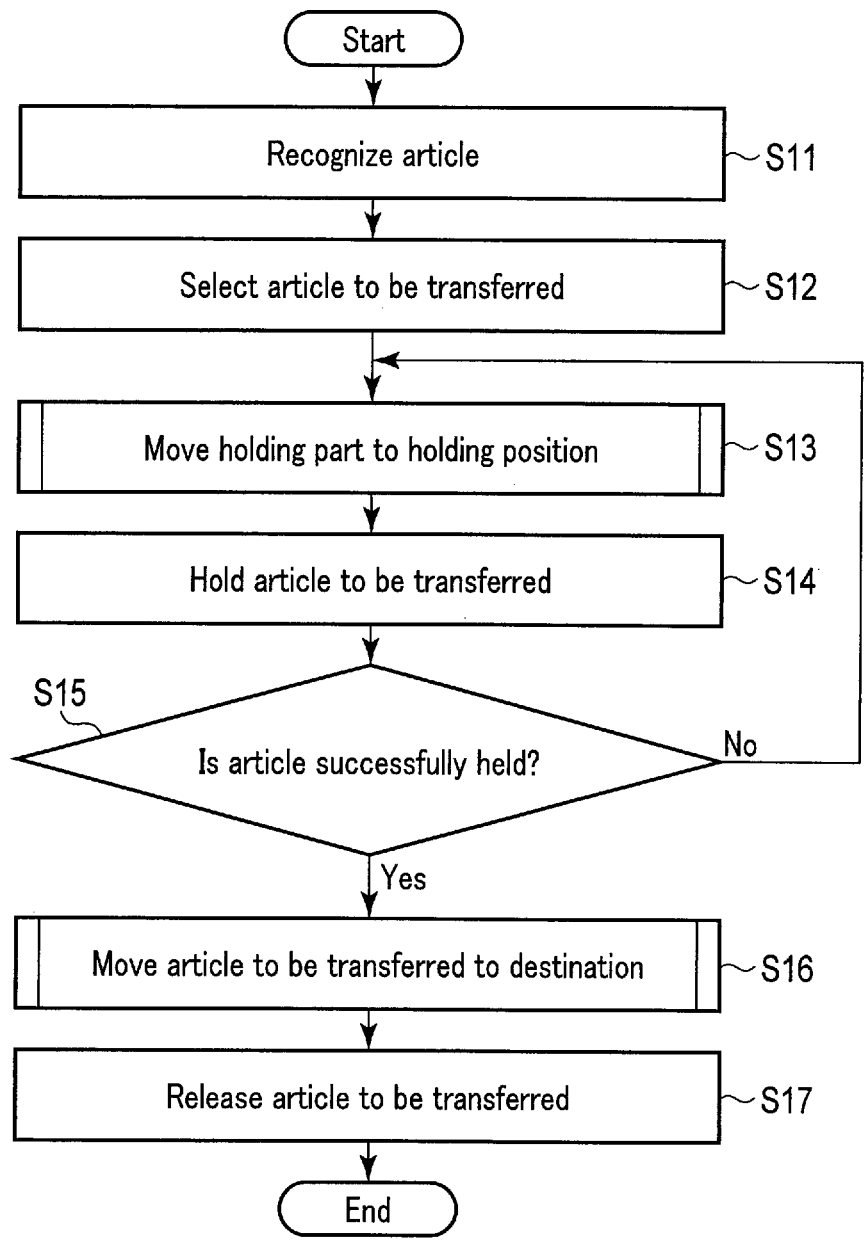
FIG. 6 is a flowchart showing an operation of the transfer equipment according to the first embodiment.

The controller body 54 recognizes three-dimensional position information of the articles 16 placed on the placement section 15 by the first to third image sensors 25A to 25C of the recognition unit 14 (step S11 in FIG. 6). The controller body 54 selects an article 16 to be transferred based on the three-dimensional position information (step S12). In this selection, for example, priority is given to an article 16 at the highest level. This eliminates the risk that an article 16 at a higher level will be crushed by the holding part 43 when an article 16 at a lower level is held first by the holding part 43. At the same time, the controller body 54 sets a target area 64 corresponding to the top face of the article 16 selected as one to be transferred from the three-dimensional position information and calculates the number of first to fourth vacuum suction pads 37A to 37D that can be disposed within the target area 64.

The controller body 54 drives the manipulator body 42 in accordance with the position of the article 16 and moves the holding part 43 to the position of the article 16 (step S13). For example, first, the holding part 43 is moved in the X and Y directions and then moved in the Z direction while it is located directly above the article 16. If the pressure of the internal space 38 of each of the first to fourth vacuum suction pads 37A to 37D of the first to fourth vacuum suction parts 32A to 32D becomes equal to or lower than a predetermined pressure after a lapse of a given period of time while the first to fourth vacuum suction pads 37A to 37D are in contact with the article 16, the article 16 is adsorbed on the first to fourth vacuum suction parts 32A to 32D. Accordingly, the article 16 can be held by the holding part 43 (step S14). Note that the manipulator part 12 can also hold and transfer the articles 16 at once.

Figure 7:
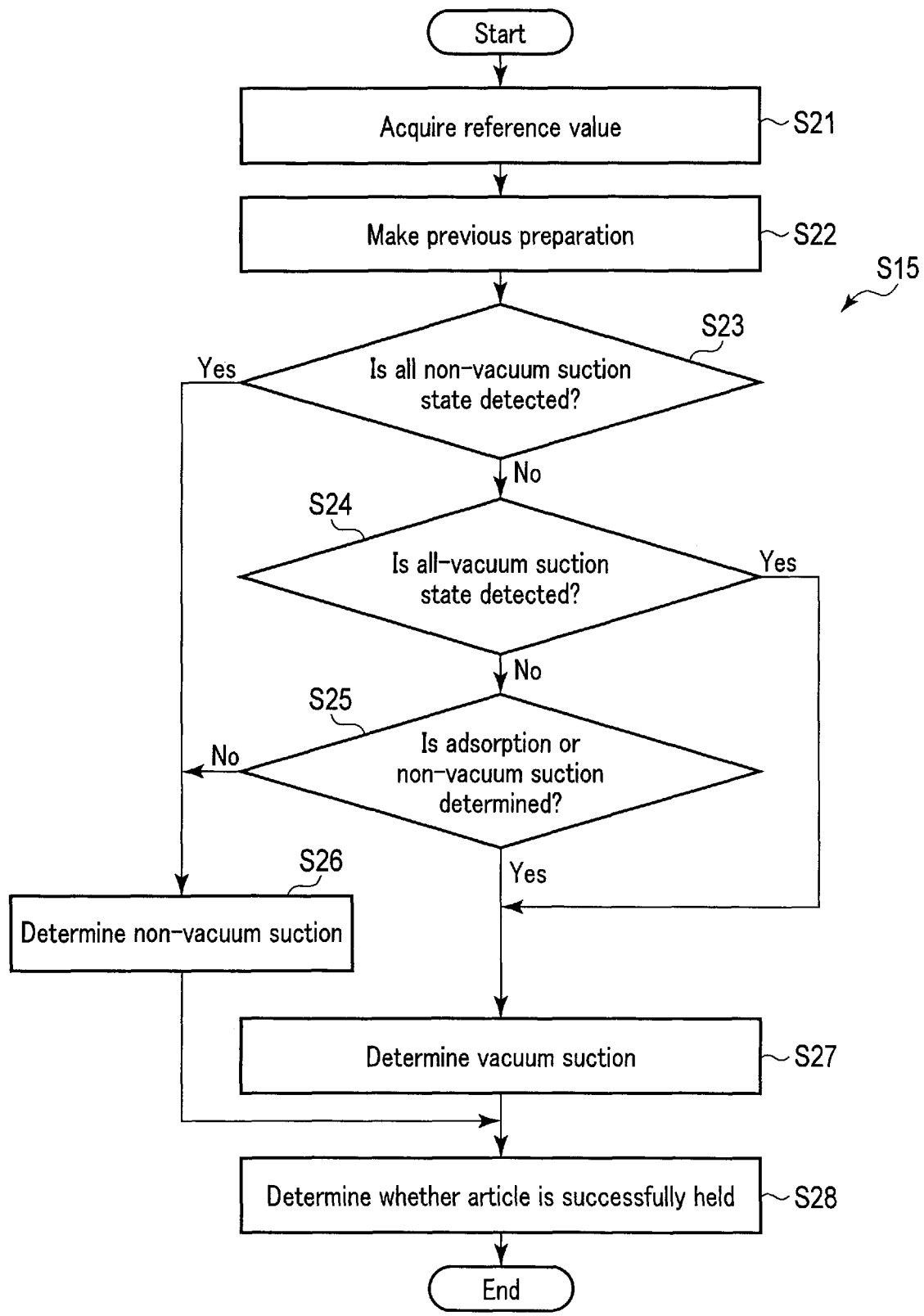
FIG. 7 is a flowchart showing the process of step S15 in the flowchart of FIG. 6 in detail.

Then, the first to fourth determination circuits 63A to 63D of the determination part 61 determine whether the article 16 is successfully held (step S15). The details of step S15 is shown in FIG. 7.

The reference values are set before the first to fourth vacuum suction parts 32A to 32D are adsorbed on the article 16 by the foregoing previous preparation. The controller body 54 acquires the reference values measured by the previous preparation from, e.g. the storage device (step S21 in FIG. 7). Then, in the previous preparation in step S22, (1) a calibration is performed, (2) a standard deviation is acquired and (3) a first threshold value is set. Since the configuration shown in FIG. 2 is the minimum one of the first embodiment, it can be considered that FIG. 4 shows four minimum configurations of the first embodiment. Therefore, the calibration (1), the acquisition of a standard deviation (2) and the setting of a first threshold value (3), are determined independently in each of the first to fourth vacuum suction parts 32A to 32D, which will be described below.

Figure 8:
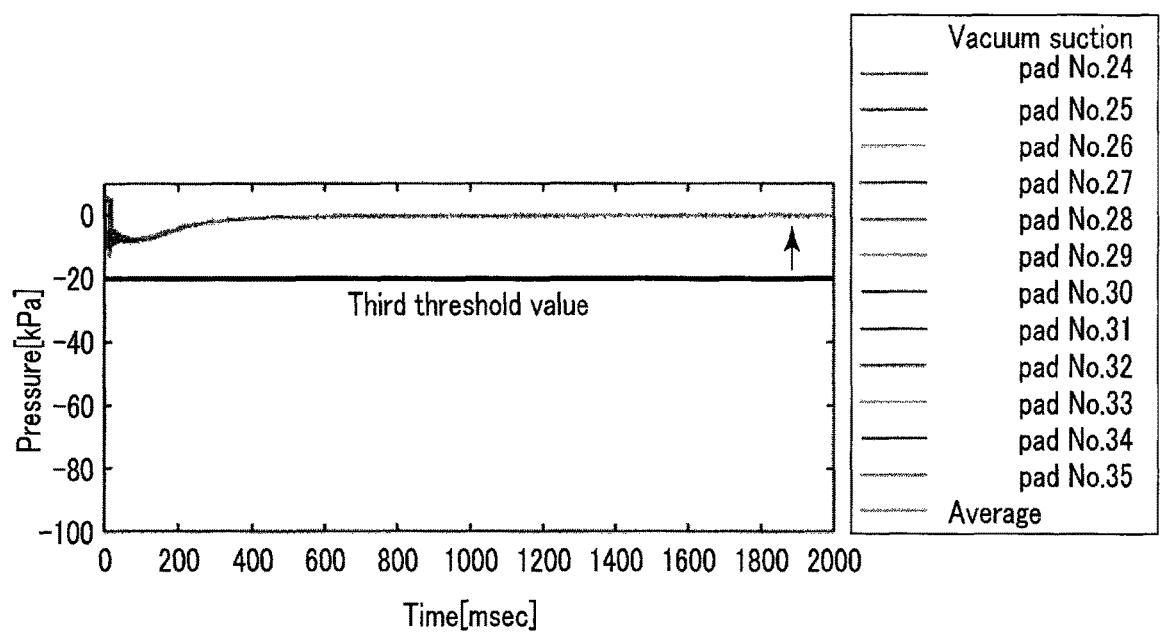
FIG. 8 is a graph showing the measured value of pressure of each vacuum suction pad and the third threshold value when a negative pressure is applied to twelve vacuum suction parts and none of the vacuum suction parts is successfully adsorbed in the transfer equipment shown in FIG. 1.

In (1), the controller body 54 acquires the actual measured value (calculated value) of pressure of the internal space 38 of each of the first to fourth vacuum suction parts 32A to 32D located within the target area 64 through the sensor parts 34. Then, the controller 13 subtracts the reference value (calibration value) from the actual measured value (calculated value) to obtain a calibrated measured value for each of the first to fourth vacuum suction parts 32A to 32D located within the target area 64. When the number of vacuum suction parts located within the target area 64 is, for example, twelve, twelve calibrated measured values can be obtained. It is therefore possible to reduce the influence of differences in pressure caused for each vacuum suction unit in idle suction state (variations in pressure due to the positions of the vacuum suction parts) and variations in sensitivity of the sensor parts 34. FIG. 8 shows an example of a calibrated measured value of each internal space 38 acquired as described above.

In (2), the controller body 54 calculates a standard deviation from the measured values of each of the first to fourth vacuum suction parts 32A to 32D located within the target area 64, which are obtained in (1). The standard deviation calculated by the controller body 54 is an example of an index of variations in the measured values. The controller body 54 (second determination circuit 63B) may use dispersion, another index (normal distribution) and the like as another example of the index of variations in the measured values.

In (3), the controller body 54 sets a first threshold value from the average value of the measured values of the first to fourth vacuum suction parts 32A to 32D located within the target area 64, which is obtained in (1). As a method of calculating the average value, it is desirable to adopt a weighted average in which a specific numerical value is weighted. In the first embodiment, the controller body 54 uses a weighted average value in which the weight of a measured value close to the maximum value is large and the weight of a measured value close to the minimum value is small.

The weighted average value is obtained by the following equation 1 using the maximum value and the minimum value obtained from the measured values of the first to fourth vacuum suction parts 32A to 32D located within the target area 64 (The situation may occur where the total number of vacuum suction parts located within the target area 64 is twelve, the number of vacuum suction parts in each of the first to fourth vacuum suction parts 32A to 32D is twelve. Depending on the range of the target area 64, for example, the situation may occur where the number of vacuum suction parts in the first vacuum suction unit 32A is four, the number of vacuum suction parts in the second vacuum suction unit 32B is eight, the number of vacuum suction parts in the third vacuum suction unit 32C is eight and the number of vacuum suction parts in the fourth vacuum suction unit 32D is four.).

Weighted Average Value=(2×Maximum Value+Minimum Value)/3   equation 1

The weighted average value makes it possible to set a threshold value in a position closer to the maximum value than an arithmetic average value. The controller body 54 causes the storage device to store the weighted average value as a first threshold value. It is desirable to calculate the weighted average value after a lapse of a given period of time (e.g. 230 milliseconds) from the start of measurement and before a lapse of a second period of time (e.g. a few seconds). Note that the average value calculation method is not limited to the weighted averaging but may be the arithmetic averaging (arithmetic mean). The maximum value and the minimum value can be calculated from the measured values using bubble sorting, selection sorting, etc. as selection algorithms.

Figure 9:
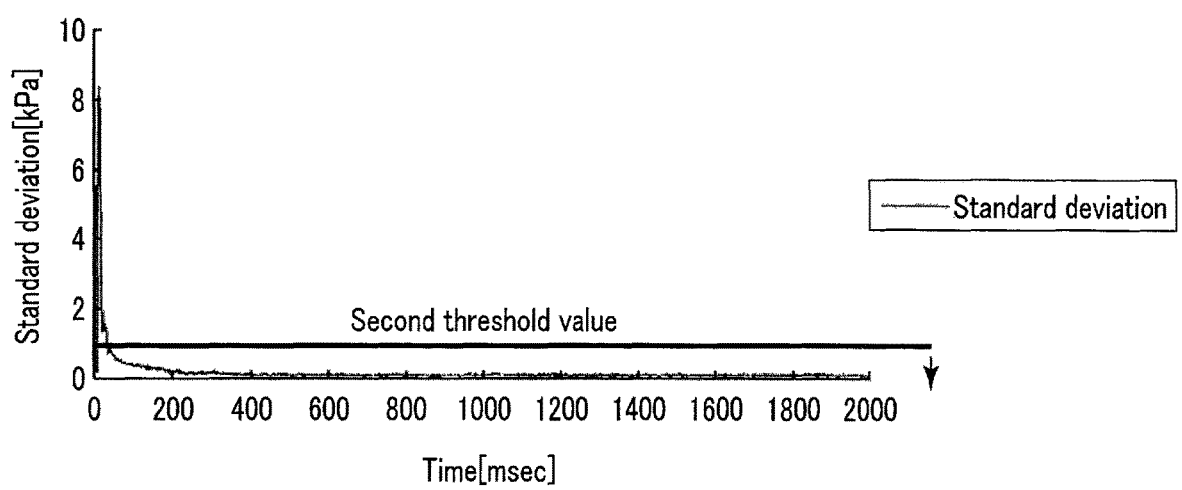
FIG. 9 is a graph showing the standard deviation of the measured value of pressure of each vacuum suction pad and the second threshold value when a negative pressure is applied to twelve vacuum suction parts and none of the vacuum suction parts is successfully adsorbed in the transfer equipment shown in FIG. 1.

In step S23, the controller body 54 detects a non-vacuum suction state in which none of the vacuum suction parts of each of the first to fourth vacuum suction parts 32A to 32D located within the target area 64 is adsorbed. Then, the second determination circuit 63B of the determination part 61 of the controller body 54 determines whether to satisfy condition 1 that the above standard deviation is smaller than a preset second threshold value. In step S23, the second threshold value is a fixed threshold value and is, for example, 0.7 kPa. The relationship between the standard deviation and the second threshold value is shown in FIG. 9. The third determination circuit 63C of the determination part 61 of the controller body 54 determines whether to satisfy condition 2 that the measured values of each of the first to fourth vacuum suction parts 32A to 32D located within the target area 64 are all larger than a preset third threshold value. The third threshold value is a fixed threshold value and is, for example, −20 kPa. An example of the relationship between the third threshold value and the measured value is shown in FIG. 8. It is desirable that the determinations as to whether to satisfy conditions 1 and 2 be made after a lapse of a given period of time (e.g. 230 milliseconds) from the start of measurement and before a lapse of a second period of time (e.g. a few seconds). When the controller body 54 determines that both conditions 1 and 2 are satisfied, it detects an all-non-vacuum suction state in which none of the vacuum suction parts of the first to fourth vacuum suction parts 32A to 32D within the target area 64 is adsorbed. When the controller body 54 detects the all-non-vacuum suction state, it advances to steps S26 and S28, in which the controller body 54 determines whether the article 16 can successfully be held or not. Detecting the all-non-vacuum suction state, the controller body 54 determines that the article 16 cannot successfully be held. For example, when the controller body 54 detects that the vacuum suction parts of the first vacuum suction unit 32A in the target area 64 are not adsorbed and the vacuum suction parts of the second to fourth vacuum suction parts 32B to 32D in the target area 64 are adsorbed, it determines that the article 16 is successfully held, and moves to the process described below.

When the controller body 54 determines in step S23 that at least one of conditions 1 and 2 is not satisfied, the controller body 54 advances from step S23 to its subsequent step S24. In step S24, the controller body 54 detects an all-vacuum suction state in which the first to fourth vacuum suction parts 32A to 32D located within the target area 64 are all adsorbed on the article 16. Then, the second determination circuit 63B of the determination part 61 of the controller body 54 determines whether to satisfy condition 3 that the above standard deviation is smaller than a preset second threshold value. In step S24, the second threshold value is, for example, 1.0 kPa and may be 0.7 kPa as the second threshold value in step S23. The relationship between the standard deviation and the second threshold value is shown in FIG. 11. The fourth determination circuit 63D of the determination part 61 of the controller body 54 determines whether to satisfy condition 4 that each of the measured values of the first to fourth vacuum suction parts 32A to 32D located within the target area 64 is smaller than a preset fourth threshold value. The fourth threshold value is a fixed threshold value and is, for example, −30 kPa. An example of the relationship between the fourth threshold value and the measured value is shown in FIG. 10. It is desirable that the determinations as to whether to satisfy conditions 3 and 4 be made after a lapse of a given period of time (e.g. 230 milliseconds) from the start of measurement and before a lapse of a second period of time (e.g. a few seconds). When the controller body 54 determines that both conditions 3 and 4 are satisfied, it detects an all-vacuum suction state in which all of the first to fourth vacuum suction parts 32A to 32D within the target area 64 are adsorbed on the article 16. When the controller body 54 detects the all-vacuum suction state, it advances to steps S27 and S28, in which the controller body 54 determines whether the article 16 can successfully be held or not. Detecting the all-vacuum suction state, the controller body 54 determines that the article 16 can successfully be held.

When the controller body 54 determines in step S24 that at least one of conditions 3 and 4 is not satisfied, the controller body 54 advances from step S24 to its subsequent step S25. In step S25, the controller body 54 determines whether each of the first to fourth vacuum suction parts 32A to 32D within the target area 64 is adsorbed or not.

The first determination circuit 63A of the determination part 61 of the controller body 54 determines whether to satisfy condition 5 that the measured value of each of the first to fourth vacuum suction parts 32A to 32D within the target area 64 is smaller than the first threshold value. This case is imaged in FIG. 12. FIG. 12 shows that, of twelve vacuum suction parts belonging to each of the first to fourth vacuum suction parts 32A to 32D, eight vacuum suction parts succeed in being adsorbed. (The number of vacuum suction parts of the first vacuum suction unit 32A in the target area 64 is twelve, and eight vacuum suction parts of them succeed in being adsorbed. The same holds true for the second to fourth vacuum suction parts 32B to 32D.) FIG. 13 shows a standard deviation of the measured value of pressure of each of the first to fourth vacuum suction parts 32A to 32D in this state. When each of the first to fourth vacuum suction parts 32A to 32D include vacuum suction parts in both the non-vacuum suction state and the vacuum suction state, the measured values vary. It is desirable that the determinations as to whether to satisfy condition 5 be made after a lapse of a given period of time (e.g. 230 milliseconds) from the start of measurement and before a lapse of a second period of time (e.g. a few seconds). When condition 5 is satisfied, the first determination circuit 63A determines that each vacuum suction unit of the first to fourth vacuum suction parts 32A to 32D is in an vacuum suction state (step S27). When condition 5 is not satisfied, the first determination circuit 63A determines that each vacuum suction unit of the first to fourth vacuum suction parts 32A to 32D is in a non-vacuum suction state (step S26). When the determination about all the vacuum suction parts of the first to fourth vacuum suction parts 32A to 32D in the target area 64 is completed, the determination as to whether the article 16 succeeds in being adsorbed can be made as follows, for example. When the amount of variation in the measured value acquired by a sensor part 34 located halfway through its corresponding tube 33 is larger than a predetermined value, the first determination circuit 63A may determine that the vacuum suction parts have failed in holding the article 16 and the determination can be based on the amount of deformation, etc. of the first to fourth vacuum suction pads 37A to 37D, which is measured by image acquisition. Furthermore, some of the first to fourth vacuum suction pads 37A to 37D can be provided with a contact sensor and a proximity sensor to make the determination from the variation in sensor output. Alternatively, the determination can be made appropriately based on the type of the article 16, the negative pressure of each of the first to fourth vacuum suction parts 32A to 32D, the number of first to fourth vacuum suction parts 32A to 32D within the target area 64 and the like. The vacuum suction force of the vacuum suction parts can be calculated based on the ultimate vacuum and the contact effective area of the vacuum suction parts. Therefore, when the weight of the article 16 is normal and the number of first to fourth vacuum suction parts 32A to 32D within the target area 64 is twelve, if ten of these twelve vacuum suction parts (80% of twelve vacuum suction parts) are in an vacuum suction state, the first determination circuit 63A determines that the vacuum suction parts have succeeded in holding the article 16. If the vacuum suction parts the number of which is nine or smaller are in a vacuum suction state under the same conditions, the first determination circuit 63A determines that the vacuum suction parts have failed in holding the article 16.

When the first determination circuit 63A determines that the vacuum suction parts have failed in holding the article 16, it returns to step S13 from step S15 in accordance with the flowchart shown in FIG. 6. Then, the controller body 54 releases each of the first to fourth vacuum suction parts 32A to 32D in a vacuum suction state from the vacuum suction state by the method described later and lifts the holding part 43 in the Z-axis direction. After that, the controller body 54 lowers the holding part 43 with the direction control valve 31 connected to the suction unit 27 and brings the first to fourth vacuum suction parts 32A to 32D into contact with the article 16 to try to hold the article 16 again. In the first embodiment, when the controller body 54 has failed in holding the article 16, it tries to hold it again. The first embodiment is not limited to this. For example, in the case of the failure, the controller body 54 may move the holding part 43 to hold another article 16 on a priority basis. Alternatively, the controller body 54 may notify a user of abnormality.

When the controller body 54 determines that the holding part 43 has succeeded in holding the article 16, it controls the manipulator body 42 to move the article 16 to its destination together with the holding part 43 (step S16). When the article 16 is placed on the conveyance unit 17 of the destination, the controller body 54 switches the direction control valve 31 to bring each of the first to fourth vacuum suction parts 32A to 32D into contact with the pressurization unit 28. Accordingly, air can be discharged from all the first to fourth vacuum suction parts 32A to 32D to release the vacuum suction states between the article 16 and the first to fourth vacuum suction parts 32A to 32D (vacuum break). It is thus possible to separate the article 16 and the first to fourth vacuum suction parts 32A to 32D with reliability (step S17). The transfer operation for the article 16 is completed.

Figure 14:
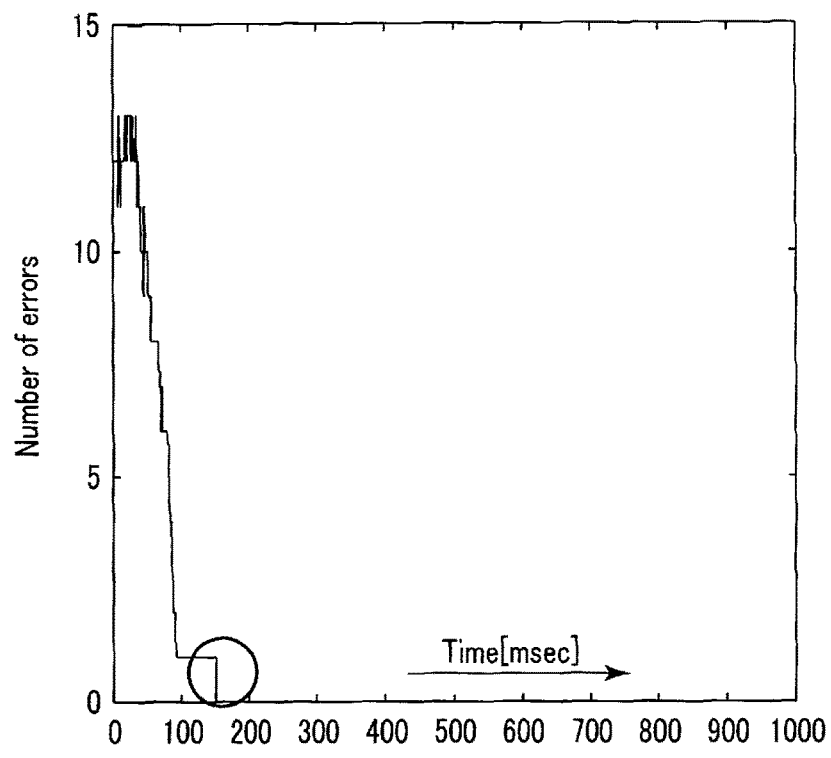
FIG. 14 is a graph showing the number of detected errors in vacuum suction and non-vacuum suction, which varies with time, when the number of first to fourth vacuum suction parts within a target area is twelve in the first embodiment.
Figure 15:
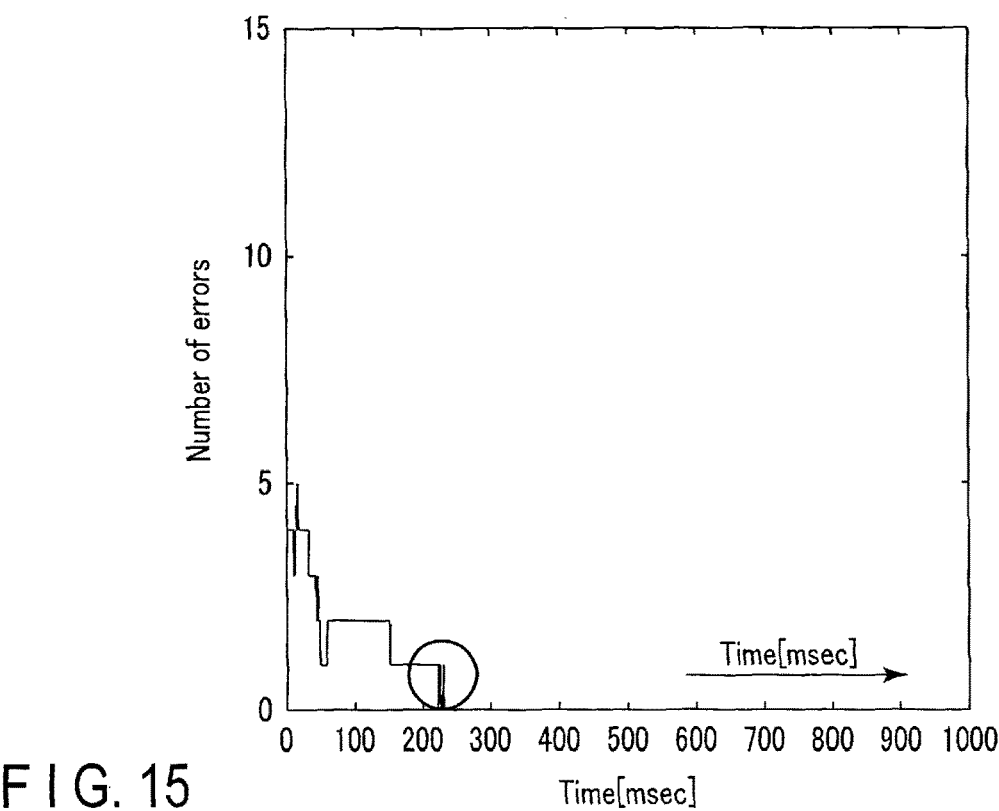
FIG. 15 is a graph showing the number of detected errors in vacuum suction and non-vacuum suction, which varies with time, when the number of first to fourth vacuum suction parts within a target area is four in the first embodiment.

FIGS. 14 and 15 each show the number of errors in determination, detected using the determination method of the first embodiment. These figures show that the results of determinations made as to the vacuum suction or non-vacuum suction state for each of the first to fourth vacuum suction parts 32A to 32D by the same method as described above differ in number from the actual vacuum suction states. In FIG. 14, the number of vacuum suction parts of each of the first to fourth vacuum suction parts 32A to 32D within the target area 64 is twelve. In this case, no errors are detected after a lapse of 150 milliseconds after the vacuum suction. In FIG. 15, the number of vacuum suction parts of each of the first to fourth vacuum suction parts 32A to 32D within the target area 64 is four. In this case, no errors are detected after a lapse of 230 milliseconds after the vacuum suction. In the first embodiment, therefore, a reference value, a measured value and a standard deviation which are used in each determination, are acquired after a lapse of a given period of time (230 milliseconds) from the vacuum suction and before a lapse of a second period of time (a few seconds). In the first embodiment, a vacuum suction determination can be made at high speed; however, since a threshold value determination is made using a standard deviation under conditions 1 and 3, the influence of suction performance and piping routes of the suction unit 27 varies the measured value immediately after the vacuum suction, thus causing an error in determination.

According to the first embodiment, the transfer equipment 11 includes a first negative-pressure generation source configured to generate a negative pressure, a plurality of first vacuum suction parts 32A connected to the first negative-pressure generation source, each of the first vacuum suction parts 32A having an internal space 38 and being configured to adsorb an article 16 by the negative pressure introduced into the internal space 38 from the first negative-pressure generation source, a sensor part 34 configured to acquire a plurality of measured values each corresponding to the negative pressure of the internal space 38, and a first determination circuit 63A configured to set an average value of the measured values as a first threshold value and compare the first threshold value and each of the measured values to determine a vacuum suction state in which a first vacuum suction unit 32A corresponding to a measured value is adsorbed on the article 16 when the measured value is smaller than the first threshold value and determine a non-vacuum suction state in which a first vacuum suction unit 32A corresponding to a measured value is not adsorbed on the article 16 when the measured value is larger than the first threshold value.

The determination method includes setting an average value obtained from a plurality of measured values corresponding to negative pressures of internal spaces 38 of a plurality of first vacuum suction parts 32A as a first threshold value and comparing the first threshold value with the measured values to determine a vacuum suction state in which the first vacuum suction parts 32A corresponding to the measured values are adsorbed on an article 16 when the measured values are smaller than the first threshold value and determine a non-vacuum suction state in which the first vacuum suction parts 32A corresponding to the measured values are not adsorbed on the article 16 when the measured values are larger than the first threshold value.

With the foregoing transfer equipment and determination method, the first determination circuit 63A can easily determine vacuum suction or non-vacuum suction based on the average value. It is thus unnecessary to provide an additional second sensor part and it is possible to simplify the configuration of the transfer equipment 11 to reduce its manufacturing costs. If, in particular, the articles 16 can be taken out automatically and stably using the foregoing transfer equipment 11 and determination method, remarkable labor savings can be achieved.

The measured values include the maximum value and the minimum value. The average value is a weighted average value in which one of the measured values close to the maximum value has a large weight and one of the measured values close to the minimum value has a small weight.

With the foregoing transfer equipment and determination method, the weighted average value in which the weight of the measured value close to the maximum value is large is used and thus a threshold value can be set close to the maximum value. Since the vacuum suction and non-vacuum suction states of the vacuum suction parts of the first vacuum suction unit 32A can favorably be separated to prevent an error due to an erroneous determination from occurring and prevent an article from dropping when it is held and conveyed, the transfer efficiency of the articles 16 can be improved. Therefore, the transfer equipment 11 can be improved in its robustness.

The measured values are acquired from the vacuum suction parts of the first vacuum suction parts 32A located within the target area 64 corresponding to an article 16. Since a first threshold value can be set only from the corresponding measured values within the target area 64, the determination can be achieved at low costs and with high precision. Accordingly, an error due to an erroneous determination can be prevented from occurring and the article 16 can be prevented from dropping when it is held and conveyed, with the result that the transfer efficiency of the articles 16 can be improved.

The transfer equipment 11 includes the second determination circuit 63B configured to determine that the vacuum suction parts of the first vacuum suction parts 32A are all in the vacuum suction state or the non-vacuum suction state when an index of variations in the measured values is smaller than a preset second threshold value. The second determination circuit 63B can easily determine that all the vacuum suction parts of the first vacuum suction unit 32A are in the vacuum suction state or the non-vacuum suction state on the basis of the index of variations. It is thus possible to easily exclude a special case of the all-vacuum suction state or all-non-vacuum suction state from the determination flow as an exception. Therefore, determination time can be shortened, determination precision can be improved and the number of errors due to an erroneous determination can be decreased.

The transfer equipment 11 includes the third determination circuit 63C configured to determine the all-non-vacuum suction state in which the vacuum suction parts of the first vacuum suction unit 32A are all in the non-vacuum suction state when all the measured values are larger than a preset third threshold value. With this configuration, the determination can be made using the preset third threshold value as well as the above index of variations and thus a special case of the all-nonvacuum suction state can be excluded from the determination flow with higher precision. Therefore, determination precision can be improved and the number of errors due to an erroneous determination can be decreased.

The transfer equipment 11 includes the fourth determination circuit 63D configured to determine the all-vacuum suction state in which the vacuum suction parts of the first vacuum suction unit 32A are all in the vacuum suction state when all the measured values are smaller than a preset fourth threshold value. With this configuration, the determination can be made using the preset fourth threshold value as well as the above index of variations and thus a special case of the all-vacuum suction state can be excluded from the determination flow with higher precision. Therefore, determination precision can be improved and the number of errors due to an erroneous determination can be decreased.

The transfer equipment 11 includes the controller 13. The controller 13 previously acquires the measured values corresponding to the internal spaces 38 in the non-vacuum suction state as the reference values through the sensor parts 34, acquires the actual measured values corresponding to the internal spaces 38 in the vacuum suction state through the sensor parts 34, and subtracts the reference values from their respective actual measured values to obtain the measured values.

With the configuration of the controller 13, the measured values obtained through the sensor parts 34 can be calibrated. It is therefore possible to reduce the influence of variations in pressure due to the positions of the vacuum suction parts of the first vacuum suction unit 32A, variations in sensitivity of the sensor parts 34, and the like.

First Modification to First Embodiment

Transfer equipment 11 according to a first modification to the first embodiment will be described below with reference to FIGS. 16 and 17. The first modification differs from the first embodiment in that the controller body 54 controls the holding part 43 such that the holding part 43 spans more pad groups (first to fourth vacuum suction pad groups 51A to 51D). Hereinafter, the configurations different from those of the first embodiment will be mainly described, and the configurations similar to those of the first embodiment will not be shown or described.

The controller body 54 sets a target area 64 corresponding to the top face of an article 16 selected as one to be transferred, from three-dimensional position information obtained from a recognition unit 14. The controller body 54 calculates the number of first to fourth vacuum suction pads 37A to 37D that can be disposed within the target area 64, from the dimensions of the first to fourth vacuum suction pads 37A to 37D and the interval between the first to fourth vacuum suction pads 37A to 37D. For example, in the case of FIG. 16, twelve (4×3) vacuum suction pads (first and second vacuum suction pads 37A and 37B) are disposed within the target area 64.

Figure 16:
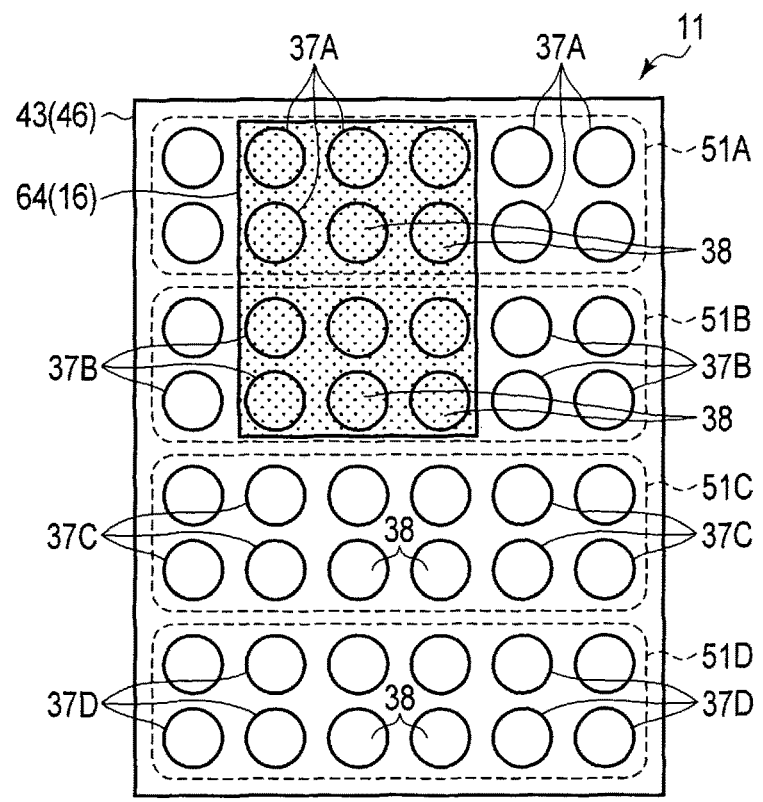
FIG. 16 is a plan view showing a first state in which an article (target area) spans two vacuum suction pad groups in transfer equipment according to a first modification to the first embodiment.
Figure 17:
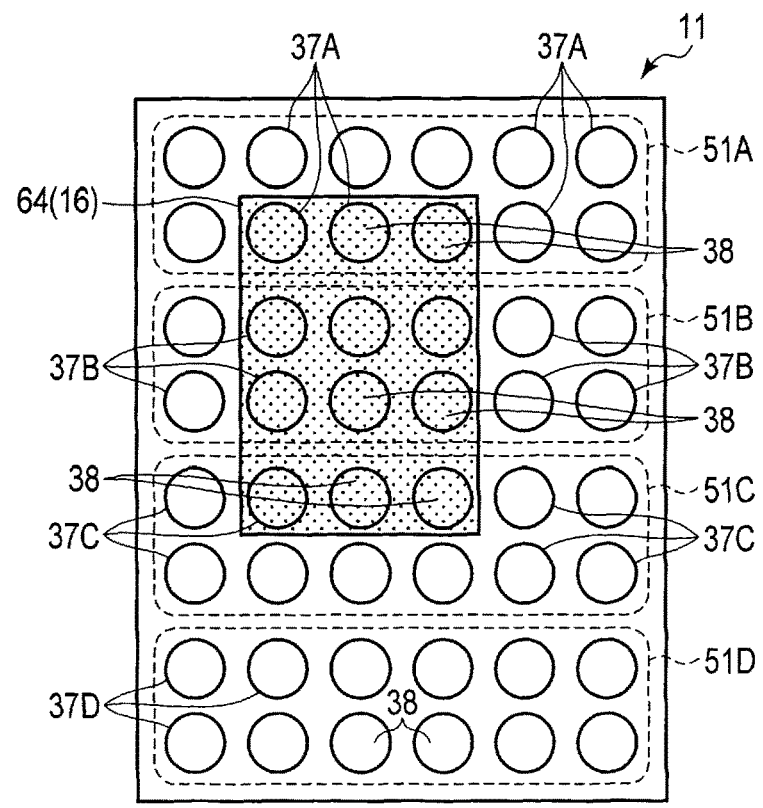
FIG. 17 is a plan view showing a second state in which an article (target area) spans three vacuum suction pad groups in the transfer equipment according to the first modification to the first embodiment.

If, as in the first embodiment, the number of vertical-direction vacuum suction pads of each of the first to fourth vacuum suction pad groups 51A to 51D is two and the number of first to fourth vacuum suction pads 37A to 37D arranged in the vertical direction within the target area 64 is an even number (multiples of two), there are two patterns of a first state in which an article 16 spans a predetermined number (e.g. two) of vacuum suction pad groups as shown in FIG. 16 and a second state in which an article 16 spans vacuum suction pad groups the number of which is larger than the predetermined number (e.g. three) as shown in FIG. 17. In the first state, a suction force (negative pressure) is received from two suction units 27 and in the second state, a suction force (negative pressure) is received from three suction units 27. The second state is more desirable to hold a breathable article because the suction force is stronger and so is the folding force of the article. The controller body 54 chooses the second state on a priority basis under the conditions of the number of vertical-direction vacuum suction pads of each of the first to fourth vacuum suction pad groups 51A to 51D, the number of first to fourth vacuum suction pads 37A to 37D arranged in the vertical direction within the target area 64 and the like, and moves the holding part 43 to a given position where the holding part 43 receives a negative pressure from three suction units 27 (first and second negative-pressure generation sources).

If, as in the first embodiment, the number of vertical-direction vacuum suction pads of each of the first to fourth vacuum suction pad groups 51A to 51D is two and the number of first to fourth vacuum suction pads 37A to 37D arranged in the vertical direction within the target area 64 is an odd number (not multiples of two), the suction force remains unchanged (the total number of suction units 27 that receive a negative pressure remains unchanged) even though the holding part 43 moves to the target area 64 including vacuum suction pads arranged in whatever manner; thus, the above control is not performed. The storage device stores algorithms (programs) about the control, and the algorithms can be read out of the CPU of the controller body 54.

The above control can properly be performed even though the number of vertical-direction vacuum suction pads of each of the first to fourth vacuum suction pad groups 51A to 51D is not two. Consider an example where the number of vertical-direction vacuum suction pads of each vacuum suction pad group is three and the number of first to fourth vacuum suction pads 37A to 37D arranged in the vertical direction within the target area 64 is multiples of three (e.g. six). In this example, too, there are two patterns of a first state in which an article 16 spans a predetermined number (e.g. two) of vacuum suction pad groups (first to fourth vacuum suction pad groups 51A to 51D) and a second state in which an article 16 spans vacuum suction pad groups the number of which is larger than the predetermined number (e.g. three). The controller body 54 chooses the second state on a priority basis to move the holding part 43 to a given position where the holding part 43 receives a negative pressure from three suction units 27 (first and second negative-pressure generation sources). The storage device stores algorithms (programs) about this control, and the algorithms can be read out of the CPU of the controller body 54.

The operation performed after the holding part 43 is moved to the target area 64 is the same as in the first embodiment.

The transfer equipment 11 includes a plurality of second negative-pressure generation sources configured to generate a negative pressure, a plurality of second vacuum suction parts connected to the second negative-pressure generation sources, each of the second vacuum suction parts having a second internal space 38 and configured to adsorb an article 16 by the negative pressure introduced into the second internal space 38 from the second negative-pressure generation sources, a holding part 43 provided with a plurality of first vacuum suction parts 32A and a plurality of second vacuum suction parts 32B and configured to hold the article 16 through the first vacuum suction parts 32A and the second vacuum suction parts 32B, a moving mechanism configured to move the holding part 43 from a first position opposed to the article 16 to a second position of a destination, a recognition unit 14 configured to recognize the article 16 visually, and a controller 13 configured to move the holding part 43 to a predetermined position through the moving mechanism such that a first state is changed to a second state based on information from the recognition unit 14, when the first state is a state in which a sum total of the number of first negative-pressure generation sources that apply the negative pressure to the article 16 and the number of second negative-pressure generation sources that apply the negative pressure to the article 16 is a predetermined number and the second state is a state in which a sum total of the number of first negative-pressure generation sources that apply the negative pressure to the article 16 and the number of second negative-pressure generation sources that apply the negative pressure to the article 16 is larger than the predetermined number.

With the foregoing configuration, the controller 13 can hold the article 16 by giving priority to the second state. Therefore, even though the weight of the article 16 is large, the controller 13 can generate a great suction force to perform a stable transfer operation for the article 16. When the article 16 is formed of a corrugated cardboard box or the like, air flows through the article, or what is called an air leak occurs. When an air leak occurs, the ultimate vacuum of each vacuum suction unit is more increased by adsorbing and holding the article 16 using the negative-pressure generation sources, with the result that the vacuum suction force is improved. Thus, a sufficient vacuum suction force is generated and a stable transfer operation can be performed for the article 16. Even though a suction unit malfunctions, the risk that the article 16 drops can be reduced because another suction unit holds a portion of the article 16, with the result that the transfer equipment 11 can be improved in reliability. In FIGS. 16 and 17, the first to fourth vacuum suction pad groups 51A to 51D are aligned; however, they are not limited to the alignment. The first to fourth vacuum suction pad groups 51A to 51D can be misaligned and mixed when the vacuum suction parts are arranged on the flat plane and, in this case, too, the first modification to the first embodiment in which the article 16 is adsorbed and held using more negative-pressure generation sources, can be applied.

Second Modification to First Embodiment

Transfer equipment 11 according to a second modification to the first embodiment will be described below. The second modification differs from the first embodiment in that the first threshold value is not a weighted average value but is set in a section where a difference between adjacent two measured values becomes the largest. Hereinafter, the configurations different from those of the first embodiment will be mainly described, and the configurations similar to those of the first embodiment will not be shown or described.

The first threshold value is set by the controller body 54 from the measured values of each of the first to fourth vacuum suction parts 32A to 32D located within the target area 64 obtained by the previous preparation (1) in step S22. The controller body 54 arranges a plurality of measured values in order from the minimum value to the maximum value in each of the first to fourth vacuum suction parts 32A to 32D and makes a difference between the absolute values of adjacent two measured values to set the first threshold value within a section where the difference becomes the largest. As the first threshold value, for example, an intermediate value in the section where the difference becomes the largest can be used, but any value can be used if it falls within the section where the difference becomes the largest. The other configurations of the second modification are the same as those of the first embodiment. Note that if the first to fourth vacuum suction parts 32A to 32D located within the target area 64 are different in number, they may also be different in the first threshold value.

According to the second modification, the transfer equipment 11 includes a first negative-pressure generation source configured to generate a negative pressure, a plurality of first vacuum suction parts 32A having internal spaces 38 connected to the first negative-pressure generation source and configured to adsorb an article 16 by the negative pressure introduced into the internal spaces from the first negative-pressure generation source, a sensor part 34 configured to acquire a plurality of measured values corresponding to the negative pressure of the internal spaces 38, and a first determination circuit 63A configured to arrange the measured values in order from a minimum value to a maximum value, make a difference between absolute values of adjacent two measured values, set a first threshold value within a section where the difference becomes the largest, and compare the first threshold value and the measured values to determine that a first vacuum suction unit 32A corresponding to a measured value is in a vacuum suction state when the measured value is smaller than the first threshold value and determine that a first vacuum suction unit 32A corresponding to a measured value is in a non-vacuum suction state when the measured value is larger than the first threshold value.

With the foregoing configuration, the first threshold value as well as the weighted average value can be set easily and thus the vacuum suction state or non-vacuum suction state of the first vacuum suction parts 32A can be determined with reliability. It is therefore possible to reduce the number of errors due to an erroneous determination.

Second Embodiment

Transfer equipment 11 according to a second embodiment will be described with reference to FIGS. 18 to 22. The second embodiment differs from the first embodiment in that the valves of the flow paths 35 corresponding to the first to fourth vacuum suction parts 32A to 32D in the non-vacuum suction state within the target area 64 are closed. Hereinafter, the configurations different from those of the first embodiment will be mainly described, and the configurations similar to those of the first embodiment will not be shown or described.

In the second embodiment, the controller body 54 controls the vacuum suction parts belonging to the first to fourth vacuum suction parts 32A to 32D outside the target area 64 to close the direction control valves 31.

An example of an operation of the transfer equipment according to the second embodiment will be described with reference to FIGS. 18 to 20. The controller body 54 sets a target area 64 corresponding to the top face of an article 16 selected as an object to be transferred, from three-dimensional position information and calculates the number of first to fourth vacuum suction pads 37A to 37D that can be arranged within the target area 64. Note that the acquisition of a reference value (previous preparation) of the first embodiment and the preprocessing in step S22 are performed before step S13 or using data of the last-executed transfer step.

Figure 18:
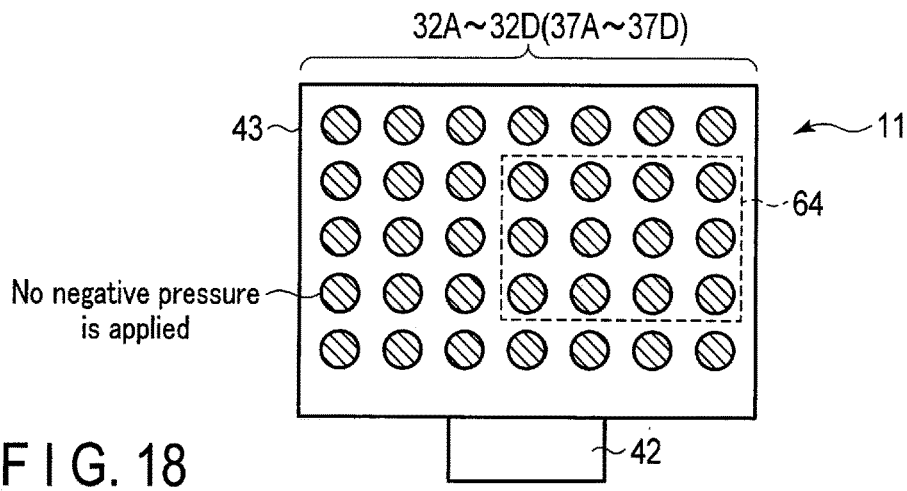
FIG. 18 is a schematic diagram showing transfer equipment according to a second embodiment, including a holding part, first to fourth vacuum suction parts and a target area, in which a connection of the first to fourth vacuum suction parts to the suction units is opened within the target area and a connection of the first to fourth vacuum suction parts to the suction units is closed outside the target area.

At the beginning, the controller body 54 controls the direction control valves 31 to close the valve portions 36 and stops supplying a negative pressure to all the first to fourth vacuum suction parts 32A to 32D as shown in FIG. 18.

Figure 19:
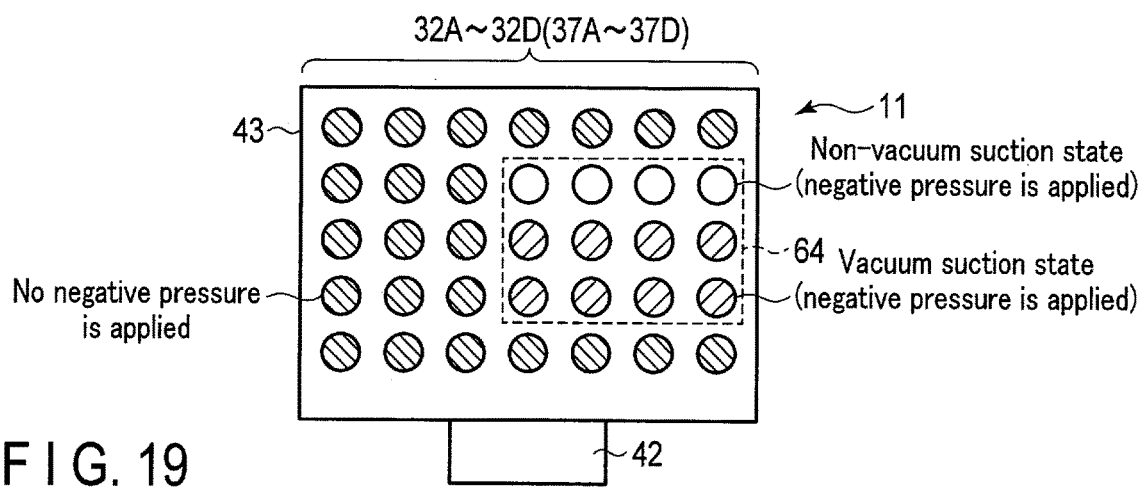
FIG. 19 is a schematic diagram showing first to fourth vacuum suction parts in an vacuum suction state and first to fourth vacuum suction parts in a non-vacuum suction state within the target area in the transfer equipment shown in FIG. 18.

As shown in FIG. 19, the controller body 54 also controls the direction control valves 31 to open only the valve portions 36 of the first to fourth vacuum suction parts 32A to 32D located within the target area 64 and connect the first to fourth vacuum suction parts 32A to 32D located within the target area 64 to the suction units 27. Furthermore, the controller body 54 controls the direction control valves 31 to close the valve portions 36 of the first to fourth vacuum suction parts 32A to 32D located outside the target area 64. The vacuum suction force (negative pressure) is therefore concentrated on the first to fourth vacuum suction parts 32A to 32D arranged within the target area 64.

The controller body 54 drives the manipulator body 42 in accordance with the position of the article 16 to move the holding part 43 to the position of the article 16. The holding part 63 is moved in the X and Y directions first and then moved in the Z direction while it is located directly above the article 16.

If the pressure of the internal space 38 of each of the first to fourth vacuum suction pads 37A to 37D of the first to fourth vacuum suction parts 32A to 32D becomes equal to or lower than a predetermined pressure after a lapse of a given period of time while the first to fourth vacuum suction pads 37A to 37D are in contact with the article 16, the article 16 is adsorbed on the first to fourth vacuum suction pads 37A to 37D. Accordingly, the article 16 can be held by the holding part 43. If the pressure is higher than the first threshold value, the controller body 54 determines that the first to fourth vacuum suction pads 37A to 37D are in the non-vacuum suction state in which they have failed in adsorbing the article 16. This state is shown in FIG. 19.

Figure 20:
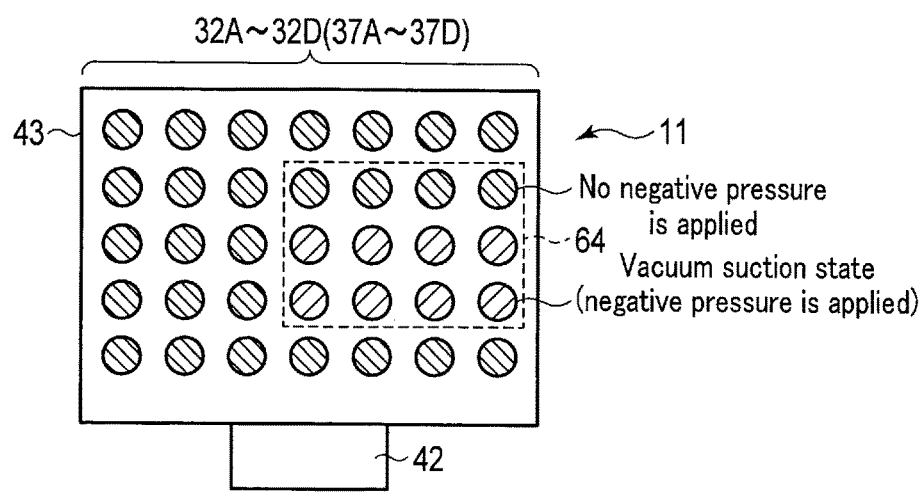
FIG. 20 is a schematic diagram showing that a connection of the first to fourth vacuum suction parts in the vacuum suction state to the suction units is opened within the target area and a connection of the first to fourth vacuum suction parts in the non-vacuum suction state to the suction units is closed within the target area in the transfer equipment shown in FIG. 18.

In the second embodiment, as shown in FIG. 20, the controller body 54 controls the direction control valves 31 to close the valve portions 36 connected to the first to fourth vacuum suction pads 37A to 37D in the non-vacuum suction state. Air can thus be prevented from flowing into the direction control valves 31 from the first to fourth vacuum suction pads 37A to 37D that have failed in adsorbing the article 16.

Note that the manipulator part 12 can hold and transfer a plurality of articles 16 at once. The subsequent steps are the same as those in the first embodiment.

Figure 21:
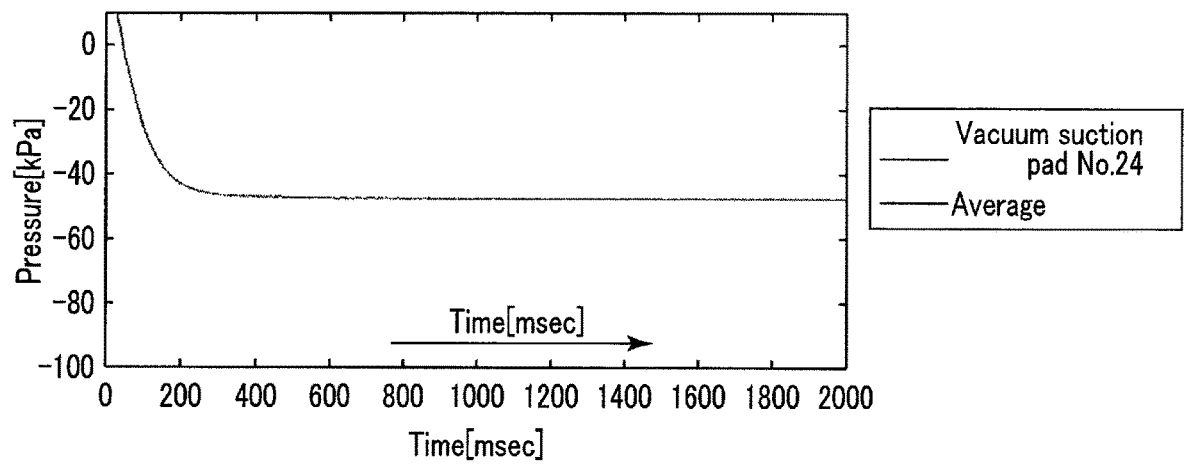
FIG. 21 is a graph showing a response waveform of pressure in one first vacuum suction unit that is adsorbed on an article when a negative pressure is applied to only the one first vacuum suction unit from a suction unit and a connection of other vacuum suction parts (first to fourth vacuum suction parts) to the suction unit is closed in the transfer equipment according to the second embodiment.
Figure 22:
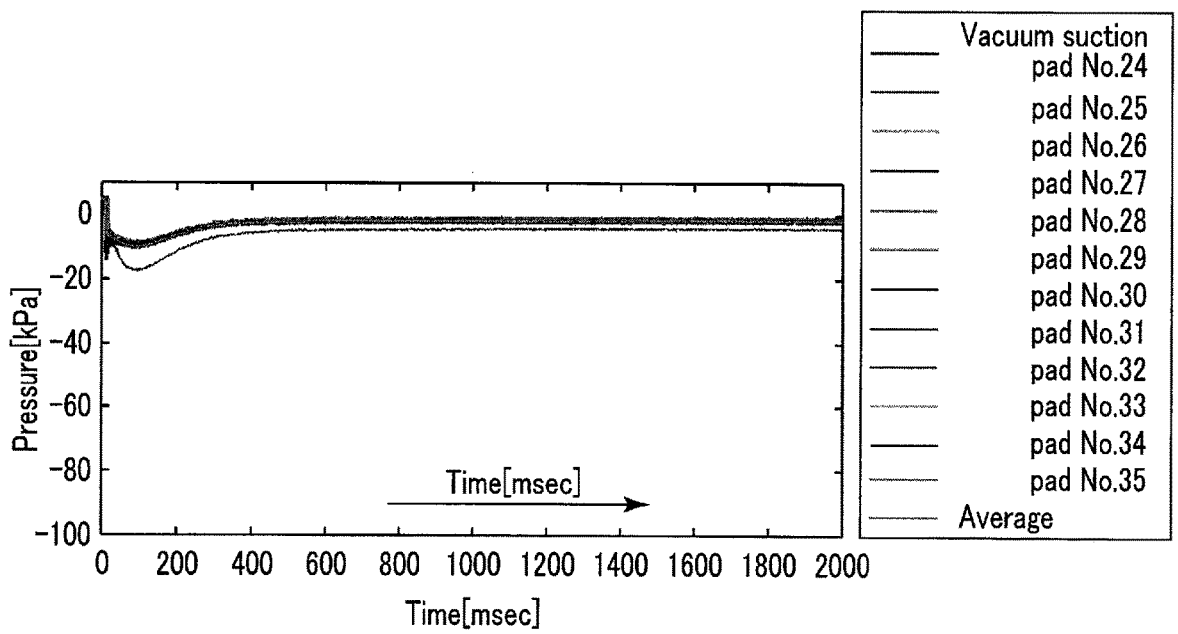
FIG. 22 is a graph showing a response waveform of pressure in each of twelve vacuum suction parts (first to fourth vacuum suction parts) when a negative pressure is applied to only the twelve vacuum suction parts from a suction unit and one of them is adsorbed on an article and the other eleven vacuum suction parts (first to fourth vacuum suction parts) are not adsorbed on the article in the transfer equipment according to the second embodiment.

Advantages of the second embodiment will be described with reference to FIGS. 21 and 22. FIG. 21 shows a response waveform of pressure in one first vacuum suction unit 32A (vacuum suction pad No. 24) that is adsorbed on an article 16 when a negative pressure is applied to only the one first vacuum suction unit 32A from a first suction unit 27 and other vacuum suction parts (vacuum suction pads Nos. 25 to 35 of the first vacuum suction parts 32A and second to fourth vacuum suction parts 32B to 32D) are closed. FIG. 22 shows a response waveform of pressure in vacuum suction pad No. 24 of one of twelve first vacuum suction parts 32A (vacuum suction pads Nos. 24 to 35) which is adsorbed on an article 16 when a negative pressure is applied to only the twelve vacuum suction parts and the other eleven vacuum suction parts (vacuum suction pads Nos. 25 to 35) are not adsorbed on the article 16. As is clear from FIGS. 21 and 22, when the valves of the vacuum suction parts in a non-vacuum suction state are closed and a negative pressure is concentrated on the vacuum suction pad No. 24 of one first vacuum suction unit 32A as shown in FIG. 21, the pressure in the first vacuum suction unit 32A is decreased (the ultimate vacuum is increased) and thus the vacuum suction force is strengthened, and the article is stably held. On the other hand, when the vacuum suction pad No. 24 of one of twelve first vacuum suction unit 32A is adsorbed on an article 16 and the other eleven vacuum suction parts (vacuum suction pads Nos. 25 to 35) are not adsorbed thereon, air flows into the direction control valve 31 from the other eleven vacuum suction parts. The pressure in the first vacuum suction unit 32A that is adsorbed on the article 16 is increased (the ultimate vacuum is increased). Thus, the vacuum suction force becomes lower than that in the case of FIG. 21.

As has been described so far, in the second embodiment, the direction control valves 31 are controlled to apply a negative pressure to only the vacuum suction parts of the first to fourth vacuum suction parts 32A to 32D within a target area 64, close the flow paths 35 communicating with the vacuum suction parts of the first to fourth vacuum suction parts 32A to 32D outside the target area 64, and then close the flow paths 35 communicating with the vacuum suction parts of the first to fourth vacuum suction parts 32A to 32D which are considered to be in a non-vacuum suction state. Thus, a negative pressure can be concentrated on the vacuum suction parts of the first to fourth vacuum suction parts 32A to 32D which succeed in their vacuum suction and the vacuum suction force can be increased.

According to the second embodiment, the transfer equipment 11 includes valve portions 36 provided halfway through a plurality of flow paths 35 connecting a plurality of internal spaces 38 to the first negative-pressure generation source and configured to open and close the flow paths 35, and a controller 13 configured to open a valve portion corresponding to a first vacuum suction unit 32A that is determined to be in the vacuum suction state by a first determination circuit 63A and close a valve portion corresponding to a first vacuum suction unit 32A that is determined to be in the non-vacuum suction state by the first determination circuit 63A.

The foregoing configuration makes it possible to stop supplying a negative pressure to the vacuum suction parts of the first vacuum suction unit 32A which are determined to be in the non-vacuum suction state. Thus, there is no air flow from the non-vacuum suction state vacuum suction parts of the first vacuum suction unit 32A to the vacuum suction state vacuum suction parts of the first unit 32A, which cause decline of the ultimate vacuum of these vacuum suction state vacuum suction parts of the first vacuum suction unit 32A. Thus, the vacuum suction force of the vacuum suction-state vacuum suction parts of the first vacuum suction unit 32A can be increased and the transfer operation of the articles 16 can be performed stably.

Third Embodiment

Transfer equipment 11 according to a third embodiment will be described with reference to FIGS. 23 to 24. The third embodiment differs from the first embodiment in that a second sensor part 65 is provided between the manipulator body 42 and the holding part 43 such that it can measure the weight (mass) of an article. Hereinafter, the configurations different from those of the first embodiment will be mainly described, and the configurations similar to those of the first embodiment will not be shown or described.

Figure 23:
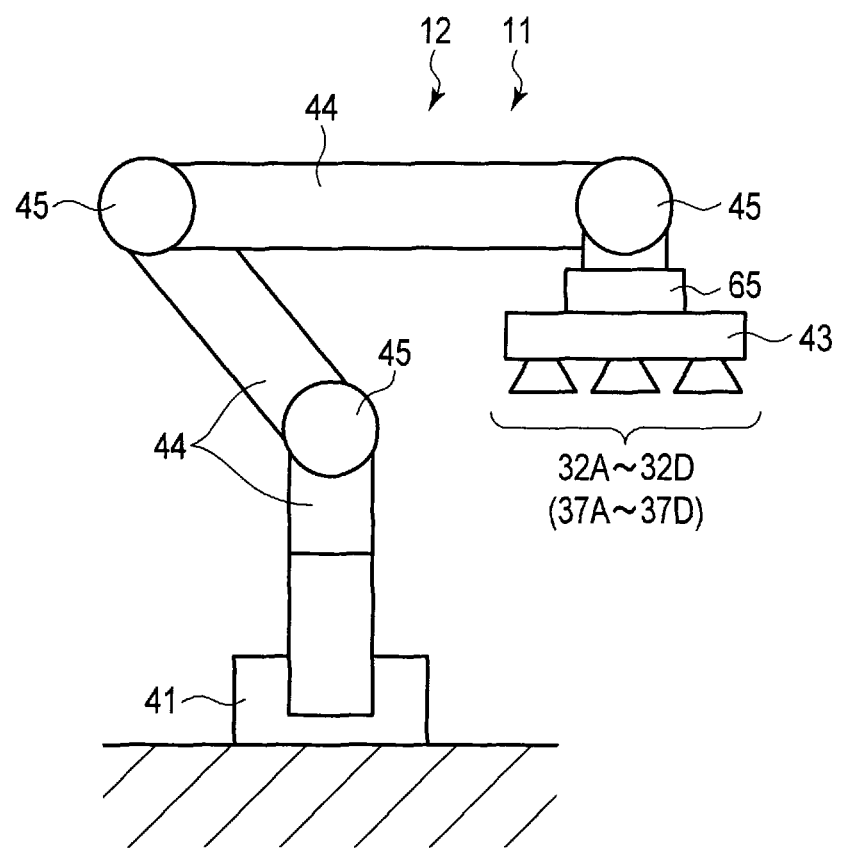
FIG. 23 is a schematic diagram showing a manipulator part and a second sensor part of transfer equipment according to a third embodiment.

As shown in FIG. 23, the manipulator part 12 includes a base stand 41, a manipulator body 42 attached to the base stand 41, a holding part 43 capable of holding an article 16 disposed near the distal end of the manipulator body 42, and a second sensor part 65 interposed between the manipulator body 42 and the holding part 43. The manipulator body 42 includes a plurality of (e.g. at least two) rod-shaped links 44 and a plurality of joint units 45 that connect the links 44 at their ends. The second sensor part 65 is configured by a force sensor to detect the weight of the article 16.

An example of an operation of the transfer equipment 11 according to the third embodiment will be described with reference to FIGS. 23 to 24.

When the transfer equipment 11 is powered on, the controller body 54 activates the suction units 27 and pressurization units 28 of the first to fourth fluid control units 18A to 18D. Accordingly, the suction units 27 each generate a negative pressure and the pressurization units 28 each generate an air pressure (positive pressure). The activation of the suction units 27 and pressurization units 28 need not always be associated with that of the transfer equipment 11. For example, the suction units 27 can be activated individually by hand and so can be the pressurization units 28. The controller 13 controls the direction control valves 31 to switch the flow paths 35 therein to a direction in which the first to fourth vacuum suction parts 32A to 32D are connected to their respective suction units 27. Thus, the pressures supplied from the suction units 27 of the first to fourth fluid control units 18A to 18D operate on the first to fourth vacuum suction parts 32A to 32D, respectively. The sensor parts 34 acquire measured values (reference values) of pressure regarding all the first to fourth vacuum suction parts 32A to 32D while the first to fourth vacuum suction parts 32A to 32D are not adsorbed on the article 16 (idle suction state). Each of the reference values may be one of values measured for a fixed time and an average value of values measured for a fixed time. These previous preparations are thus completed.

The controller body 54 recognizes three-dimensional position information of a plurality of articles 16 placed on the placement section 15 by the first to third image sensors 25A to 25C of the recognition unit 14 (step S31). The controller body 54 selects an article 16 to be transferred based on the three-dimensional position information (step S32). In this selection, for example, priority is given to an article 16 at the highest level. This eliminates the risk that an article 16 at a higher level will be crushed by the holding part 43 when an article 16 at a lower level is held first by the holding part 43. At the same time, the controller body 54 sets a target area 64 corresponding to the top face of the article 16 selected as one to be transferred from the three-dimensional position information and calculates the number of first to fourth vacuum suction pads 37A to 37D that can be disposed within the target area 64.

The controller body 54 drives the manipulator body 42 in accordance with the position of the article 16 and moves the holding part 43 to the position of the article 16 (step S33). For example, first, the holding part 43 is moved in the X and Y directions and then moved in the Z direction while it is located directly above the article 16. If the pressure of the internal space 38 of each of the first to fourth vacuum suction pads 37A to 37D of the first to fourth vacuum suction parts 32A to 32D becomes equal to or lower than a predetermined pressure after a lapse of a given period of time while the first to fourth vacuum suction pads 37A to 37D are in contact with the article 16, the article 16 is adsorbed on the first to fourth vacuum suction parts 32A to 32D (step S34). Accordingly, the article 16 can be held by the holding part 43. Note that the manipulator part 12 can also hold and transfer the articles 16 at once.

Then, the first to fourth determination circuits 63A to 63D of the determination part 61 determine whether the article 16 is successfully held (step S35). The descriptions of step S35 will be omitted because step S35 is similar to step S15 of the first embodiment.

When the first to fourth determination circuits 63A to 63D determine that the vacuum suction parts have failed in holding the article 16, the controller body 54 returns to step S33 from step S35 in accordance with the flowchart shown in FIG. 24. Then, the controller body 54 releases the first to fourth vacuum suction parts 32A to 32D from their vacuum suction states by the same method as that of the first embodiment and lifts the holding part 43 in the Z-axis direction. After that, the controller body 54 lowers the holding part 43 with the direction control valve 31 connected to the suction unit 27 and brings the first to fourth vacuum suction parts 32A to 32D into contact with the article 16 to try to hold the article 16 again. Alternatively, the controller body 54 moves the holding part 43 to hold another article 16 on a priority basis. Alternatively, the controller body 54 may notify a user (operator) of abnormality.

When the controller body 54 determines that the holding part 43 has succeeded in holding the article 16, it acquires the weight of the article 16 through the second sensor part 65. The controller body 54 calculates the ratio of the absolute value of weight (N) of the article 16 to the absolute value of total vacuum suction force (N) by which the first to fourth vacuum suction parts 32A to 32D adsorb the article 16. When the ratio is smaller than a given fifth threshold value, the controller body 54 determines that the holding force is enough (step S36). In the third embodiment, a value corresponding to 70% to 80% of the total vacuum suction force is used as the fifth threshold value. In this case, the controller body 54 moves the manipulator part 12 from a first position (placement section 15 before movement) to a second position (conveyance unit 17 after movement) in a given time (e.g. a few seconds to a few tens of seconds). On the other hand, when the ratio is equal to or larger than a given fifth threshold value and smaller than a given sixth threshold value, the controller body 54 determines that the holding force is enough (step S36). In the third embodiment, a value corresponding to 80% to 90% of the total vacuum suction force is used as the sixth threshold value. In this case, the controller body 54 moves the manipulator part 12 slowly from the first position (placement section 15 before movement) to the second position (conveyance unit 17 after movement) in a time (e.g. a few seconds to a few tens of seconds) which is longer than the given time. This prevents acceleration from increasing when the article 16 is moved and also prevents the article 16 from dropping from the holding part 43. Furthermore, when the ratio is equal to or larger than the sixth threshold value, the controller body 54 determines that the holding force is not enough because the article 16 is likely to drop (step S36). In this case, the controller body 54 returns to step S36 from step S33 in accordance with the flowchart shown in FIG. 24. Then, the controller body 54 releases each of the first to fourth vacuum suction parts 32A to 32D from their vacuum suction states by the same method as that of the first embodiment and lifts the holding part 43 in the Z-axis direction. After that, the controller body 54 lowers the holding part 43 with the direction control valve 31 connected to the suction unit 27 and brings the first to fourth vacuum suction parts 32A to 32D into contact with the article 16 to try to hold the article 16 again. Alternatively, the controller body 54 moves the holding part 43 to hold another article 16 on a priority basis. Alternatively, the controller body 54 may notify a user (operator) of abnormality.

When the controller body 54 determines that the holding force is enough, it controls the manipulator body 42 to move the article 16 to its destination together with the holding part 43 (step S37). When the article 16 is placed on the conveyance unit 17 of the destination, the controller body 54 switches the direction control valve 31 to bring each of the first to fourth vacuum suction parts 32A to 32D into contact with the pressurization unit 28. Accordingly, air can be discharged from all the first to fourth vacuum suction parts 32A to 32D to release the vacuum suction states between the article 16 and the first to fourth vacuum suction parts 32A to 32D (vacuum break). It is thus possible to separate the article 16 and the first to fourth vacuum suction parts 32A to 32D with reliability (step S38). The transfer operation for the article 16 is completed.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. For example, the vacuum suction state and non-vacuum suction state of the first to fourth vacuum suction pads 37A to 37D are determined by using a weighted average value as a threshold value or setting a threshold value in a section where a difference between the absolute values of measured values of pressure becomes the largest. The determination method is not limited to this. As another determination method, the vacuum suction state and non-vacuum suction state of the first to fourth vacuum suction pads 37A to 37D can be determined by, e.g. K-means clustering.

The accompanying claims and their equivalents are intended to cover such forms or modifications as would fall within the scope and spirit of the inventions. The inventions of the embodiments and their modifications can appropriately be, of course, combined into one invention.

The invention claimed is:

1. A determination method comprising:
setting an average value of a plurality of measured values corresponding to negative pressures of internal spaces of a plurality of first vacuum suction parts as a first threshold value;
comparing the first threshold value and the measured values;
determining a vacuum suction state in which the first vacuum suction parts corresponding to the measured values are adsorbed on an article when the measured values are smaller than the first threshold value; and
determining a non-vacuum suction state in which the first vacuum suction parts corresponding to the measured value are not adsorbed on the article when the measured values are larger than the first threshold value.

2. The determination method according to claim 1, wherein:
the measured values include a maximum value and a minimum value in the measured values; and
the average value is a weighted average value in which one of the measured values closer to the maximum value has a larger weight and one of the measured values closer to the minimum value has a smaller weight.

3. The determination method according to claim 1, further comprising the step of determining that the first vacuum suction parts are all in the vacuum suction state or the non-vacuum suction state when an index of variations in the measured values is smaller than a preset second threshold value.

4. The determination method according to claim 1, wherein the measured values are obtained by previously acquiring the measured values corresponding to the internal spaces of the first vacuum suction parts in the non-vacuum suction state as a plurality of reference values and subtracting the reference values from a plurality of actual measured values corresponding to the internal spaces of the first vacuum suction parts in the vacuum suction state.

5. The determination method according to claim 1, wherein the measured values are acquired from the first vacuum suction parts located within a target area corresponding to the article.

6. The determination method according to claim 3, further comprising the step of determining an all non-vacuum suction state in which the first vacuum suction parts are all in the non-vacuum suction state when all the measured values are larger than a preset third threshold value.

7. The determination method according to claim 3, wherein the step of determining that the first vacuum suction parts are all in the vacuum suction state or the non-vacuum suction state when an index of variations in the measured values is smaller than a preset second threshold value, is performed prior to the step of setting an average value of a plurality of measured values corresponding to negative pressures of internal spaces of a plurality of first vacuum suction parts as a first threshold value, comparing the first threshold value and the measured values, determining a vacuum suction state in which the first vacuum suction parts corresponding to the measured values are adsorbed on an article when the measured values are smaller than the first threshold value, and determining a non-vacuum suction state in which the first vacuum suction imparts corresponding to the measured value are not adsorbed on the article when the measured values are larger than the first threshold value.

8. The determination method according to claim 6, further comprising the step of determining an all-vacuum suction state in which the first vacuum suction parts are all in the vacuum suction state when all the measured values are smaller than a preset fourth threshold value.

* * * * *